United States Patent
Satoh et al.

(10) Patent No.: US 6,386,052 B1
(45) Date of Patent: May 14, 2002

(54) TORQUE SENSOR

(75) Inventors: Kouichi Satoh; Toshiyuki Onizuka; Kazuo Chikaraishi, all of Gumna (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/229,737

(22) Filed: Jan. 14, 1999

(30) Foreign Application Priority Data

Oct. 1, 1998 (JP) .......................................... 10-292765

(51) Int. Cl.$^7$ .............................. G01L 3/10; G01B 7/24
(52) U.S. Cl. ............................ 73/862.333; 73/862.08; 73/862; 73/1.09
(58) Field of Search ..................... 73/882.331, 862.333, 73/862.09, 862.11, 862.12, 862.191, 862.29, 862.322

(56) References Cited

U.S. PATENT DOCUMENTS

| | | | | |
|---|---|---|---|---|
| 4,972,726 A | * | 11/1990 | Yoshimura et al. | 73/862.36 |
| 5,522,269 A | * | 6/1996 | Takeda et al. | 73/862.333 |
| 5,752,208 A | * | 5/1998 | Lerner | 73/862.331 |
| 5,796,014 A | * | 8/1998 | Chikaraishi et al. | 73/862.331 |
| 5,811,695 A | * | 9/1998 | Satoh et al. | 73/862.331 |

FOREIGN PATENT DOCUMENTS

| | | | | |
|---|---|---|---|---|
| DE | 195 42 405 | 5/1996 | | G01L/3/10 |
| DE | 197 31 433 | 2/1998 | | G01L/3/10 |
| JP | 63-45528 | 9/1988 | | G01L/3/10 |
| JP | 7-260601 | 10/1995 | | G01L/3/10 |
| JP | 7-332916 | 12/1995 | | G01B/7/00 |

* cited by examiner

*Primary Examiner*—Benjamin R. Fuller
*Assistant Examiner*—Andre Allen
(74) *Attorney, Agent, or Firm*—Sughrue Mion, PLLC

(57) ABSTRACT

A torque sensor which does not require complicated neutral adjustment using a position adjustment mechanism or the like, which is capable of reducing cost and heat generation, improving reliability and realizing a one-system detection circuit. A torque sensor has a control calculating portion for varying operation timing of a coil for detecting torque and sample holding timing and a storage portion for storing an initial value of each element of the torque sensor. The torque is detected on the basis of sampling of transition voltage of the coil and a comparison with the initial value in the storage portion is made during detection of the torque is not being performed so that a failure of each element of the torque sensor is detected. Another torque sensor structured to detect torque in accordance with transient voltages which are generated in the portion in which coils and electric resistors are connected to each other is enabled to detect an abnormality of short circuit between a pair of the coils. At timing at which the torque is not detected, only either of rectangular-wave control voltages is applied to a transistor. At timing synchronized with falling of the control voltage, output voltage is A/D-converted and read. In accordance with whether or not output voltage is the same as power supply voltage, short circuit between the coils is detected.

8 Claims, 13 Drawing Sheets

FIG. 4
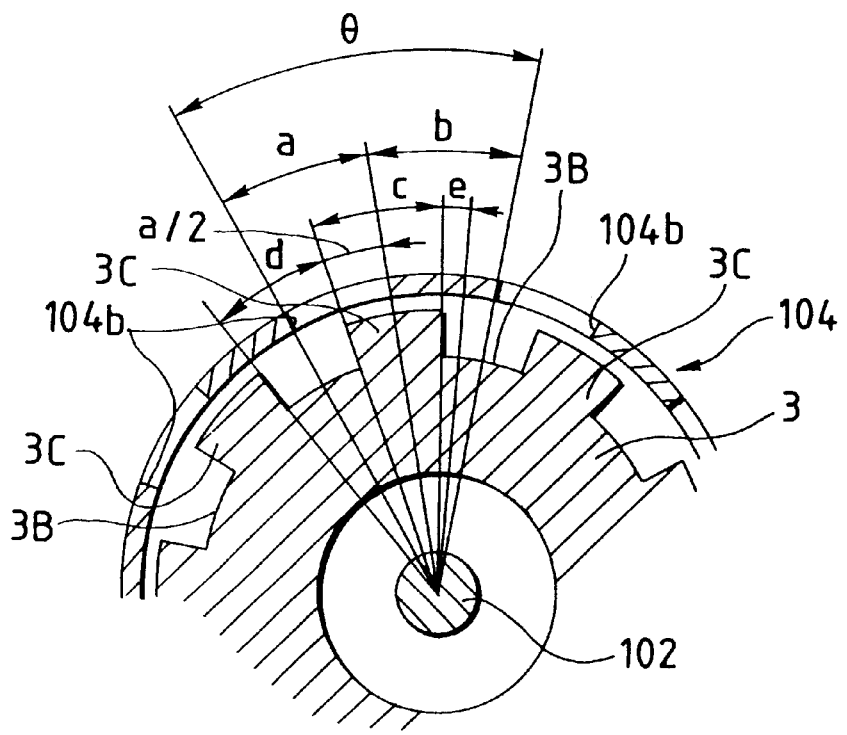
FIG. 6A
FIG. 6B
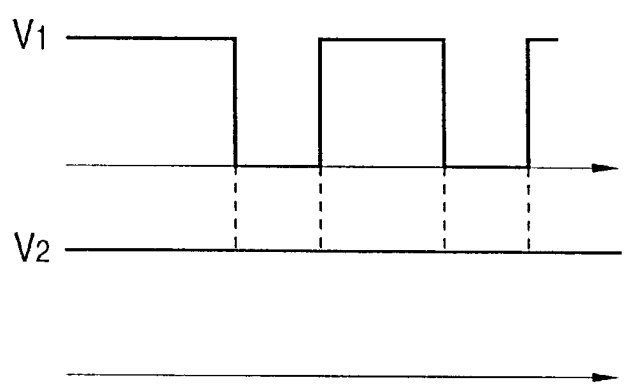

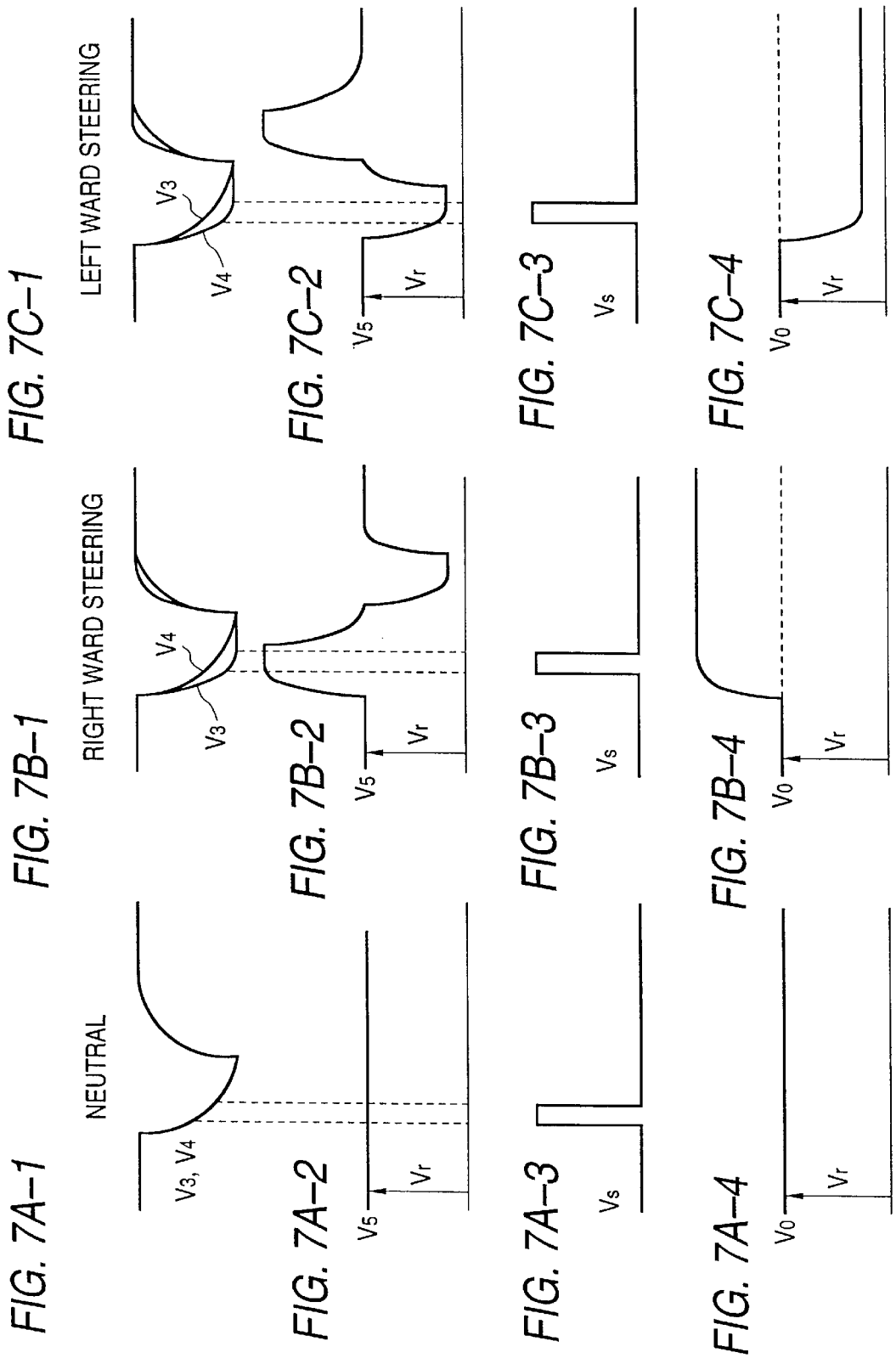

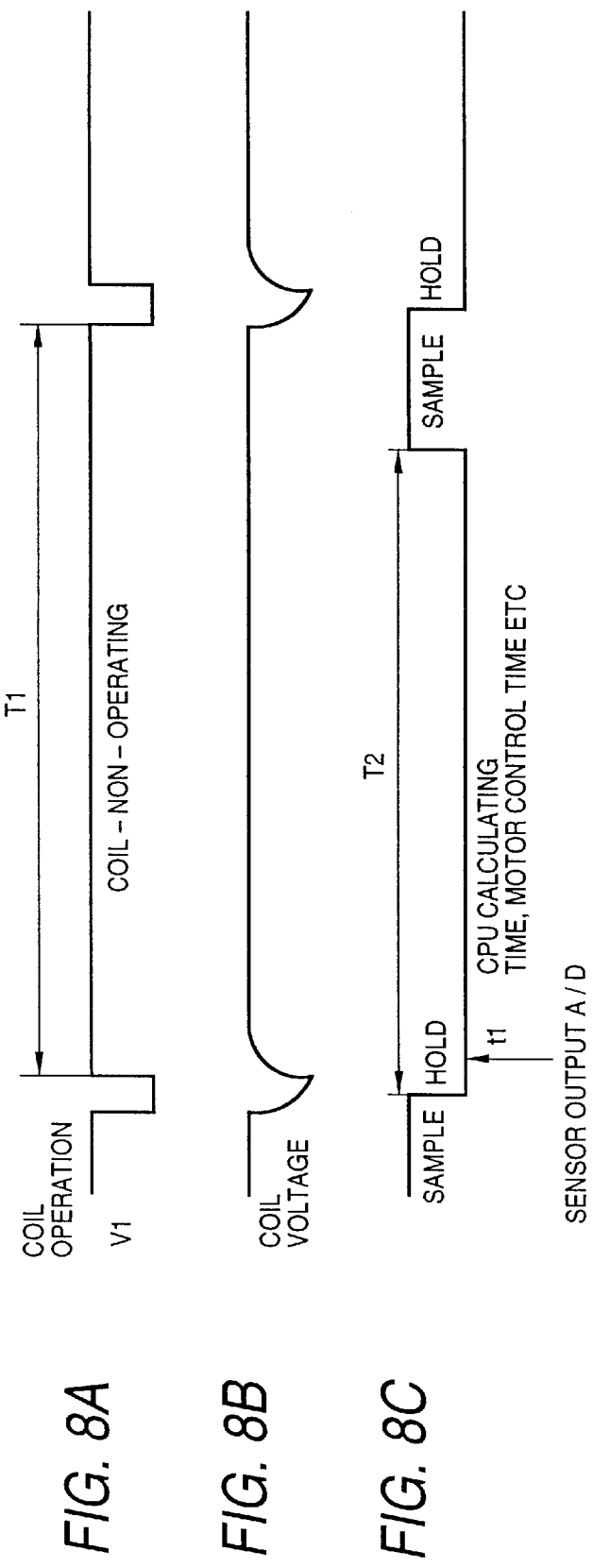

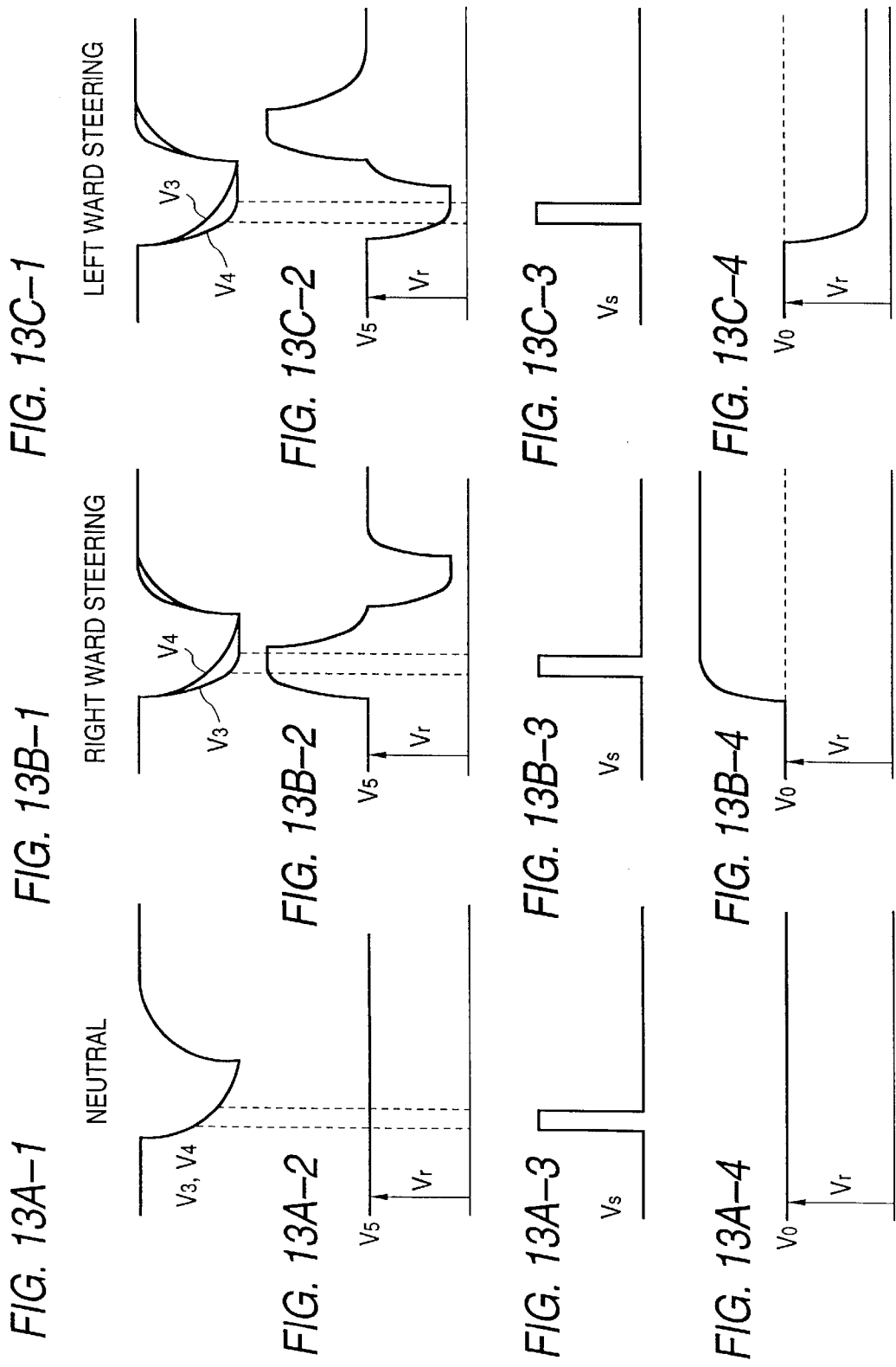

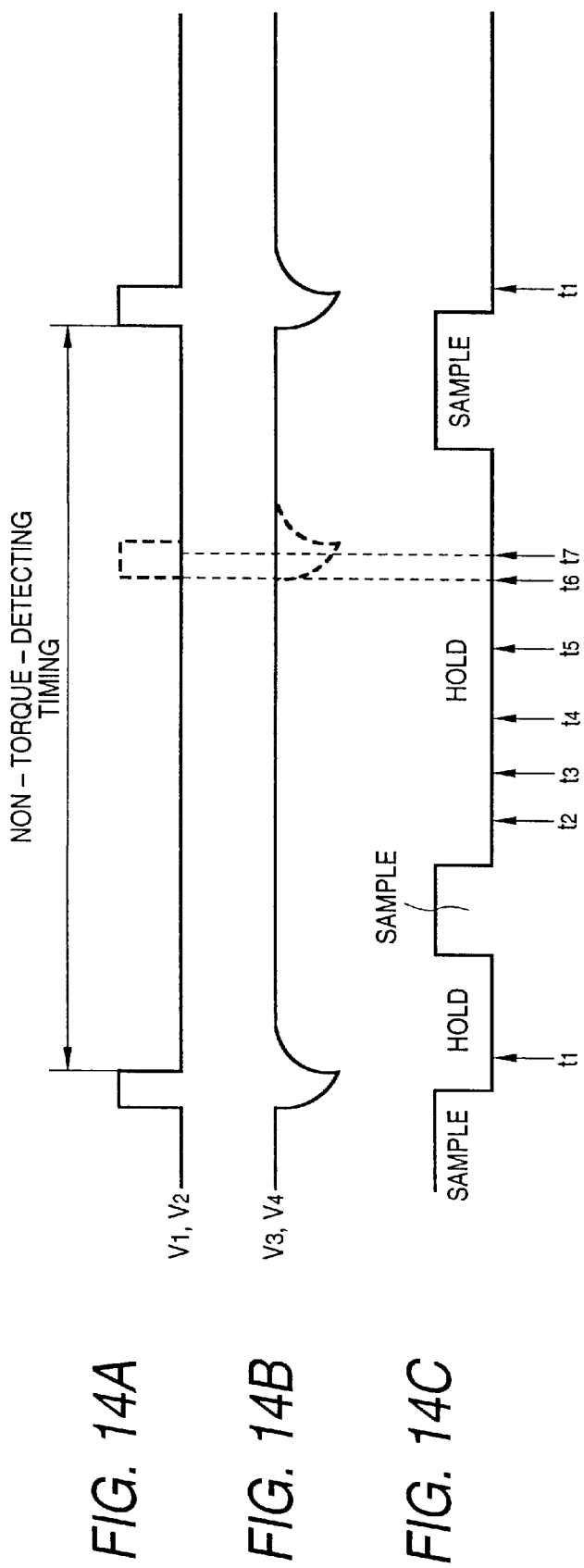

TORQUE SENSOR

BACKGROUND OF THE INVENTION

1. Field of the Invention

The present invention relates to a torque sensor for non-contact-detecting steering torque generated in a rotating shaft of a steering wheel of a vehicle, and more particularly to a torque sensor of a type, which has impedance which is changed in accordance with the generated steering torque, which is capable of easily correcting deviation in the voltage in a neutral state which is caused from a dimensional error, an assembling error or an output error of an electronic element and which is arranged to be operated in a manner different from that during the detection so as to detect breakdown of the elements. Further, the present invention also relates to a torque sensor incorporating a bridge circuit including a pair of coils having impedances which are changed in opposite directions in accordance with generated torque and a pair of electric resistors so as to detect the torque in accordance with transient voltage generated in the connection portion between the coils of the bridge circuit and the electric resistors and structured such that an abnormality of short circuit of the pair of the coils is detected.

The present application is based on Japanese Patent Applications No. Hei. 9-190121 and Hei. 10-292765, which are incorporated herein by reference.

2. Description of the Related Art

An electric power steering apparatus for assisting a steering apparatus for an automobile or a vehicle uses rotational force of a motor. The rotational force of the motor for the assistance is, through reduction gears, transmitted to a steering shaft or a rack shaft by a transmission mechanism including gears or a belt. The structure of a usual electric power steering apparatus will now be described with reference to FIG. 15. A shaft 2 of a steering wheel 1 is connected to tie rods 6 of wheels, which must be steered, through a reduction gear 3A, universal joints 4a and 4b and a pinion-and-rack mechanism 5. The shaft 2 is provided with a torque sensor 100 for detecting the steering torque of the steering wheel 1. A motor 20 for enhancing the steering force of the steering wheel 1 is connected to the shaft 2 through a clutch 21 and a reduction gear 3A. A control unit 200 for controlling the power steering apparatus is supplied with electric power from a battery 14 through an ignition key 11. The control unit 200 calculates assist-steering instruction value I for-the assist instruction in accordance with steering torque T detected by the torque sensor 100 and vehicle speed V detected by a vehicle-speed sensor 12. In accordance with the calculated assist-steering instruction value I, the control unit 200 controls an electric current which must be supplied to the motor 20. The clutch 21 is controlled by the control unit 200 so as to be turned on or off. In usual operation state, the clutch 21 is turned on (connected). If the control unit 200 determines that the steering apparatus is out of order, or if power supply from the battery 14 is interrupted by the ignition key 11, the clutch 21 is turned off (disconnected).

The control unit 200 comprises a CPU. A general function of a program which is executed in the CPU is as shown in FIG. 16. Steering torque T detected and input by the torque sensor 100 is supplied to a phase compensator 201 so that the phase of the steering torque T is compensated in order to improve the stability of the steering system. Steering torque TA having the compensated phase is supplied to an assist-steering instruction value calculator 202. Also vehicle speed V detected by the vehicle-speed sensor 12 is supplied to the assist-steering instruction value calculator 202. In accordance with the supplied steering torque TA and the vehicle speed V, the assist-steering instruction value calculator 202 determines assist-steering instruction value I which is a required control value of an electric current which is supplied to the motor 20. The assist-steering instruction value calculator 202 is provided with a memory 203. In the memory 203, the assist-steering instruction value I corresponding to the steering torque is stored such that the vehicle speed V serves as a parameter which must be used in an operation for calculating the assist-steering instruction value I which is performed by the assist-steering instruction value calculator 202. The assist-steering instruction value I is supplied to a subtractor 200A and a differentiation compensator 204 of a feed-forward system in order to raise the response speed. Deviation (I–i) in the subtractor 200A is supplied to a proportional compensator 205. An obtained proportional output is supplied to an adder 200B and an integrator 206 in order to improve the characteristic of a feedback system. Also outputs of the differentiation compensator 204 and the integrator 206 are supplied to the adder 200B so as to be added to each other. Current control value E, which is a result of addition performed by the adder 200B, is, as a motor rotating signal, supplied to a motor rotating circuit 207. Motor current value i is detected by a motor-current detection circuit 208 so that motor current value i is fed back to the subtractor 200A.

The torque sensor 100 of the above-mentioned power steering apparatus may be, for example, a torque sensor disclosed in Japanese Patent Publication No. Sho. 63-45528. In this torque sensor, two cylindrical bodies are fitted coaxially in such a manner as to rotate relatively in response to a torque generated at a shaft, wherein a long groove and teeth are alternately formed in an axial direction on the outer cylindrical surface of the inner cylindrical body while a cut is formed on the outer cylindrical body in such a manner that the overlap amount may vary according to the relative rotation between the cylindrical bodies and wherein a coil is provided so as to cover the outer cylindrical body. The torque generated on the shaft can be detected through measurement of the impedance of the coil since the impedance of the coil varies when the overlapping amount of the groove and the cut is varied by changing relative rotation position of the two cylindrical bodies.

It is certain that the above-described torque sensor is able to detect the torque generated at the shaft in response to the variation in the coil impedance. In the above-described torque sensor, however, an oscillator for oscillation of accurate sine-wave alternating current is needed for a highly accurate torque sensor since the coil is driven by a high-frequency alternating current. This causes a problem of high production costs since a large number of electronic parts which respectively require a high accuracy are needed. Another problem is that since the coil is driven by a sine-wave alternating current whereas the coil is actually driven with application of offset voltages to unify the actual direction of the current (single-side supply power drive), the structure is uneconomical with an extremely large current consumption and the large current consumption results with a large amount of heat generation.

The torque sensor encounters deviation of output voltage from a predetermined neutral voltage for a controller when input torque is zero owning to assembling error of a sensor element, such as a shaft or tolerance of en electronic part in a signal processing system. Therefore, the output voltage must always be adjusted. The adjustment of the voltage is, however, performed by adjusting the position in the torque sensor portion. Thus, a complicated operation must be performed. Since the adjustment accuracy depends on the reliability of the fixing method, movement of a fixed element causes a risk of self-steer to occur. Also A/D reference voltage for determining a predetermined voltage for the controller has tolerance. Therefore, even if the neutral voltage for the torque sensor is accurately set to a predetermined level, there is apprehension that the controller erroneously recognizes the shift of the neutral voltage from the predetermined level in spite of a fact that the neutral voltage is accurately set to the predetermined level. For example, a magnetostrictive sensor disclosed in Japanese Patent Publication No. Hei. 1-173843 comprises a memory so as to maintain the balance between two coils so that initial deviation of the sensor from the neutral level is corrected. However, the foregoing sensor cannot detect an abnormal state. To improve the reliability of the torque sensor, a plurality of sensors have been disposed to always compare values detected by the plural sensors so as to detect an abnormal state and/or prevent malfunction in accordance with change in the difference. However, there arises a problem in that the plural sensors raise the cost and a complicated detection system is required.

Further, U.S. Pat. No. 5,811,695 is incorporated herein by reference for an explanation of another type of the torque sensor. The disclosed torque sensor has a structure that a bridge circuit is constituted by a pair of coils and a pair of electric resistors. Moreover, the connection portion between the pair of the coils is connected to a power source through a coil operating circuit. The coil operating circuit incorporates a transistor which is a switching device common to the pair of the coils. A control voltage varying in a rectangular wave is applied to the gate of the transistor. The difference in the output voltage (transient voltage) allowed to appear in the portion in which the coils and the electric resistors are connected to each other is detected by a differential amplifier. In accordance with an output produced by the differential amplifier, the torque is detected.

In the above-mentioned disclosure, an abnormality monitoring portion is provided which detects an abnormality in accordance with one of the output voltages of the bridge circuit. The abnormality monitoring portion adjusts the neutral voltage of the differential amplifier in accordance with whether an instantaneous level of one of the output voltages of the bridge circuit satisfies an appropriate range. Thus, the abnormality monitoring portion controls the output voltage of the differential amplifier. As a result, a controller, to which the output voltage of the differential amplifier is applied, is able to detect an abnormality of short circuit or disconnection of both of the coils. The controller is structured in such a manner as to detect an abnormality of short circuit or disconnection of either of the coils. Note that the short circuit of the coil is a phenomenon that the coil and the ground are connected to each other.

The torque sensor disclosed as described above is applied to an electric power steering apparatus for a vehicle. If an abnormality of the foregoing type is detected, the controller interrupts control which cause assist steering torque to be generated. Thus, undesirable generation of assist steering torque can be prevented.

It is certain that the disclosed torque sensor is able to detect an abnormality of short circuit or disconnection of both of the coils or either of the coils and an abnormality of short circuit or disconnection of either of the coils.

As a result of an energetic investigation of the inventors of the present invention, a fact is found that the disclosed torque sensor cannot detect an abnormality of some kind. The abnormality which cannot be detected is an abnormality that the coils are short-circuited each other. Even if the coils are short-circuited each other, the output voltage of the bridge circuit is not fixed to the ground voltage or the power supply voltage. Moreover, the difference between the two outputs of the bridge circuit is not considerably large. Therefore, the disclosed structure cannot detect the abnormality that the coils are short-circuited each other.

If the controller cannot detect the above-mentioned abnormality, release of a clutch, which is establishing the connection between an electric motor for generating assist steering torque and a steering system in order to shift the mode to a complete manual steering state, is not permitted in spite of occurrence of an abnormality in a case where the torque sensor is applied to an electric power steering apparatus of a vehicle. What is worse, there arises a problem in that occurrence of the abnormality cannot be communicated to a driver by means of alarm display or the like.

SUMMARY OF THE INVENTION

In view of the foregoing, an object of the present invention is to provide a torque sensor which does not require a complicated neutral adjustment using a position adjustment mechanism, which is able to reduce cost and heat generation, which does not require a large space, which is able to improve reliability and which can be constituted by a single-system detection circuit.

Another object of the present invention is to provide a torque sensor which is capable of detecting even an abnormality that coil pairs are short-circuited.

To achieve the above objects, a torque sensor according to the present invention comprises: a control calculating portion for varying operation timing of a coil and sample holding timing for detecting torque; a storage portion for storing an initial value of each element of the torque sensor; a torque detecting portion detecting the torque based on sampling of transition voltage of the coil; and means for comparing the initial value in the storage portion with a current value of the each element of the torque sensor during sample holding in which the coil is not operated and detection of the torque is not performed, thereby detecting a failure of the each element of the torque sensor.

Further, there is provided a torque sensor which is used for an electric power steering apparatus which detects steering torque of a steering wheel and assists a rotation of a steering shaft integrally provided with the steering wheel with a motor. The torque sensor comprises: a torque detecting portion detecting the steering torque based on sampling of transition voltage of a coil; a control calculating portion for varying operation timing of the coil and sample holding timing; a storage portion for storing an initial value of each element of the torque sensor; and means for comparing the initial value in the storage portion with a current value of the each element of the torque sensor during sample holding in which the coil is not operated and detection of the torque is not performed, thereby detecting a failure of the each element of the torque sensor. Especially, the failure of the each element is detected in accordance with an A/D value after the sample holding at timing at which the coil is not operated, further, a neutral voltage is switched, and the failure of the each element of the torque sensor is detected in accordance with an A/D value after the neutral voltage has been switched according to the present invention.

The torque sensor according to the present invention has a structure that first and second rotating shafts disposed coaxially are connected to each other through a torsion bar;

a cylindrical member made of a conductive and non-magnetic material is integrated with the second rotating shaft in a direction of rotation such that the cylindrical member covers the outer surface of the first rotating shaft; at least a covered portion of the first rotating shaft covered with the cylindrical member is made of a magnetic material; grooves extending in the axial direction are provided for the covered portion; windows are provided for the cylindrical member such that state of overlapping the grooves is changed in accordance with the relative rotational position with the first rotating shaft; and coils are disposed to surround the portion of the cylindrical member in which the windows are formed; electric resistors are disposed in series with the coils so that torque generated at each of the first and second rotating shafts is detected in accordance with transient voltage which is generated between the coil and the electric resistance when voltages each of which varies in the rectangular wave is applied to the coils. The non-magnetic material is a paramagnetic material or a partial diamagnetic material. The magnetic material is a ferromagnetic material The magnetic permeability of the non-magnetic material is similar to that of air. The foregoing magnetic permeability is lower than that of the magnetic material. The transition voltage is final voltage which is changed owning to supply of voltage which varies in the rectangular wave. The present invention has the structure that the coils are operated with the rectangular-wave voltages. Therefore, the intervals of supply of the rectangular-wave voltages are made to be in synchronization with sampling clocks of a controller portion to which an output of the torque sensor is produced. Thus, duration of electric current flow through each coil is considerably shortened and current consumption can be reduced. Also heat generation can be reduced. The rectangular-wave has an advantage that it can easily and accurately be generated with a small number of electronic parts as compared with sine wave.

Moreover, the present invention has a structure that each coil is operated by a method having different states of a stationary state and a transition state. Coil operation timing and sample holding timing are varied. When torque detection is not being performed, an operation different from that when a torque signal is being detected is performed. A comparison with an assembly initial value stored in the storage portion is made so that a failure of each element is detected. Moreover, timing at which each element is operated is combined to confirm all of the circuit portions. Thus, a single system circuit structure is realized.

Further, to achieve the above objects, another type of torque sensor according to the present invention comprises: directions in accordance with the torque; a pair of electric resistors each connected in series with the respective coil so as to detect the torque in accordance with transient voltage generated in portions in which the coils and the electric resistors are connected to each other; and switching means being capable of generating the transient voltage, the switching means being provided for each of the pair of the coils. One of the switching means is operated at timing at which the torque is not detected so that an abnormality of the pair of the coils is detected.

The above torque sensor has a structure that first and second rotating shafts disposed coaxially are connected to each other through a torsion bar; a cylindrical member made of a conductive and non-magnetic material is integrated with the second rotating shaft in a direction of rotation such that the cylindrical member covers the outer surface of the first rotating shaft; at least a covered portion of the first rotating shaft covered with the cylindrical member is made of a magnetic material; grooves extending in the axial direction are provided for the covered portion; two lines of windows are provided for the cylindrical member such that a state of overlapping the grooves is changed in accordance with the relative rotational position with respect the first rotating shaft; and a pair of coils are disposed to surround the portion of the cylindrical member in which the windows are formed; the pair of the coils and a pair of electric resistors are in series and individually connected to each other; a switching device is provided for each of the pair of the coils so that torque generated at the first and second rotating shafts is detected in accordance with transient voltages generated between the coils and the electric resistors when the switching devices are operated with the rectangular-wave voltages.

The non-magnetic material is a paramagnetic material or some of diamagnetic material. The magnetic material is a ferromagnetic material The magnetic permeability of the non-magnetic material is similar to that of air. The foregoing magnetic permeability is lower than that of the magnetic material. The transient voltage is a voltage which is changed owning to supply of voltage varying in the rectangular wave. Since the coils are operated with the rectangular-wave voltages, the intervals of supply of the rectangular-wave voltages is made to be in synchronization with sampling clocks of a controller portion to which an output of the torque sensor is produced. Thus, the duration of electric current flow through each coil is considerably shortened and current consumption can be reduced. Also heat generation can be reduced. The rectangular wave has an advantage that it can easily and accurately be generated with a small number of electronic parts as compared with sine wave. If a sample hold circuit for maintaining the transient voltage which is generated between the coils and the electric resistor is provided, the torque can be detected even if the transient voltage disappears in a short time.

A specific structure for detecting the pair of the coils may be a structure in which either of the switching means is operated at timing (between moments of time at which the two switching devices are operated with the rectangular-wave voltages in a specific example of the structure of the torque sensor) at which the torque is not detected. In accordance with an output voltage generated between the coil to which the other switching means correspond and the electric resistor, short circuit between the pair of the coils can be detected. That is, if one of the switching means is operated in a state in which the pair of the coils are not short-circuited, the voltage between the coil and the electric resistor must be the power supply voltage because no electric current is passed through the coil to which the other switching means correspond. In a state in which the pair of the coils are short-circuited, also an electric current is passed through the coil to which the other switching means corresponds when one of the switching means is operated. As a result, the voltage between the coil and the electric resistor is made to be lower than the power supply voltage.

Features and advantages of the invention will be evident from the following detailed description of the preferred embodiments described in conjunction with the attached drawings.

BRIEF DESCRIPTION OF THE DRAWINGS

In the accompanying drawings:

FIG. 4 is a cross sectional view taken along line B—B shown in FIG. 1 and showing the cylindrical member and the output shaft;

FIGS. 6A and 6B are graphs showing the operation which is performed when rectangular wave is employed;

FIGS. 7A-1 to 7C-4 are timing charts of the operation according to the present invention;

FIGS. 8A to 8C are timing charts of an example of the operation which is performed in a usual state;

FIGS. 13A-1 to 13C-4 are graphs showing each voltage in the motor control circuit according to the embodiment in FIG. 11;

FIGS. 14A to 14C are waveform graphs showing execution timing of an abnormality detecting process;

DETAILED DESCRIPTION OF THE PREFERRED EMBODIMENTS

An embodiment of the present invention will now be described with reference to the drawings.

Figure 1:
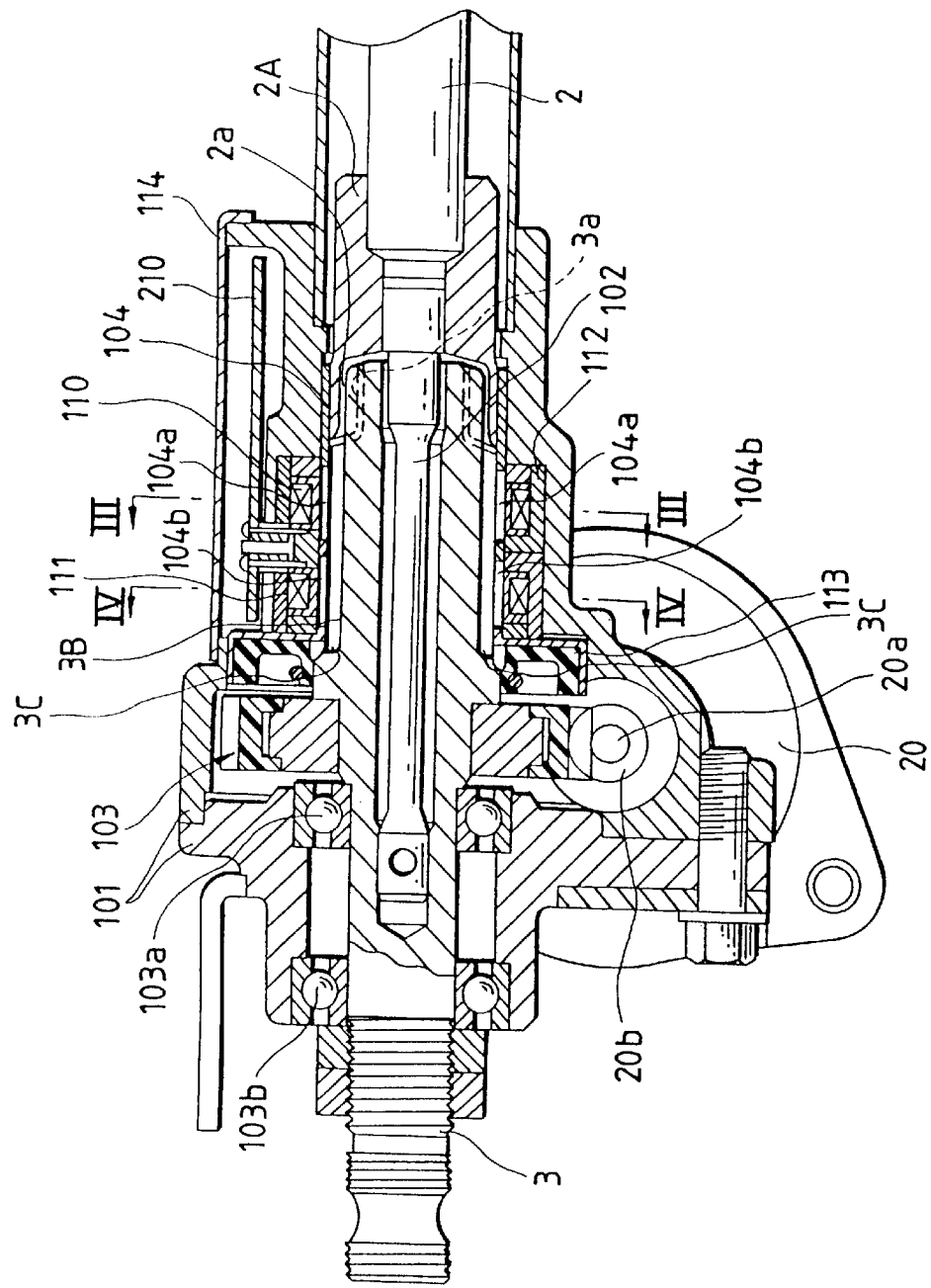
FIG. 1 is a cross sectional view showing the structure of an electric power steering apparatus to which a torque sensor according to the present invention is applied.
Figure 2:
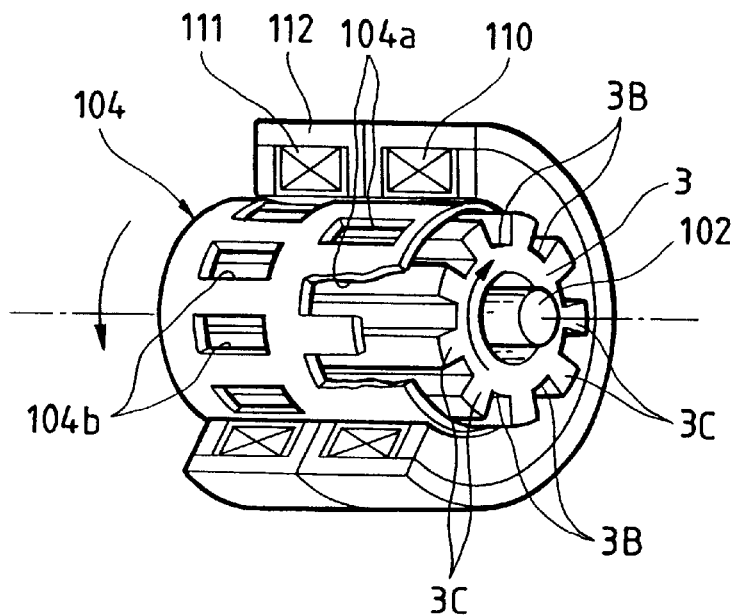
FIG. 2 is a perspective view showing a portion in the vicinity of a cylindrical member.
Figure 3:
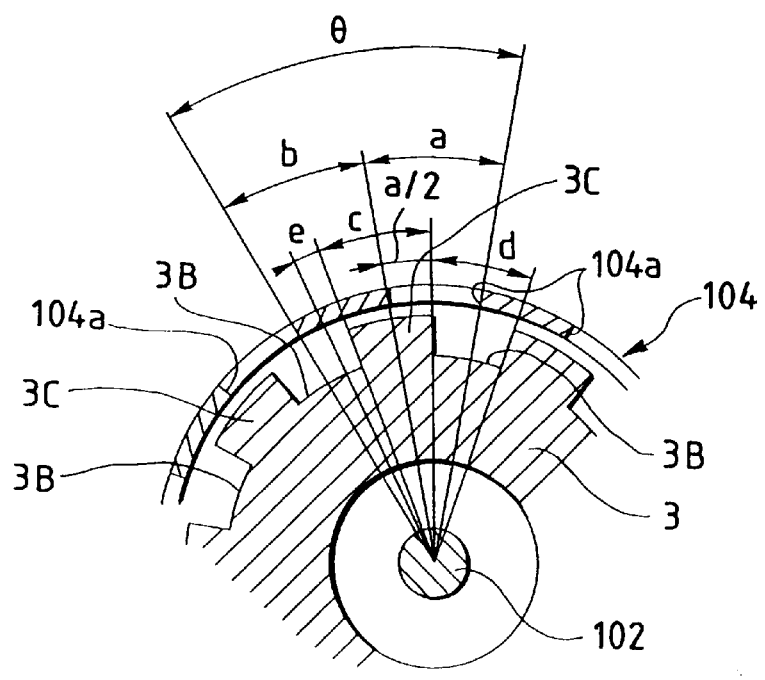
FIG. 3 is a cross sectional view taken along line A—A shown in FIG. 1 and showing the cylindrical member and an output shaft.
Figure 15:
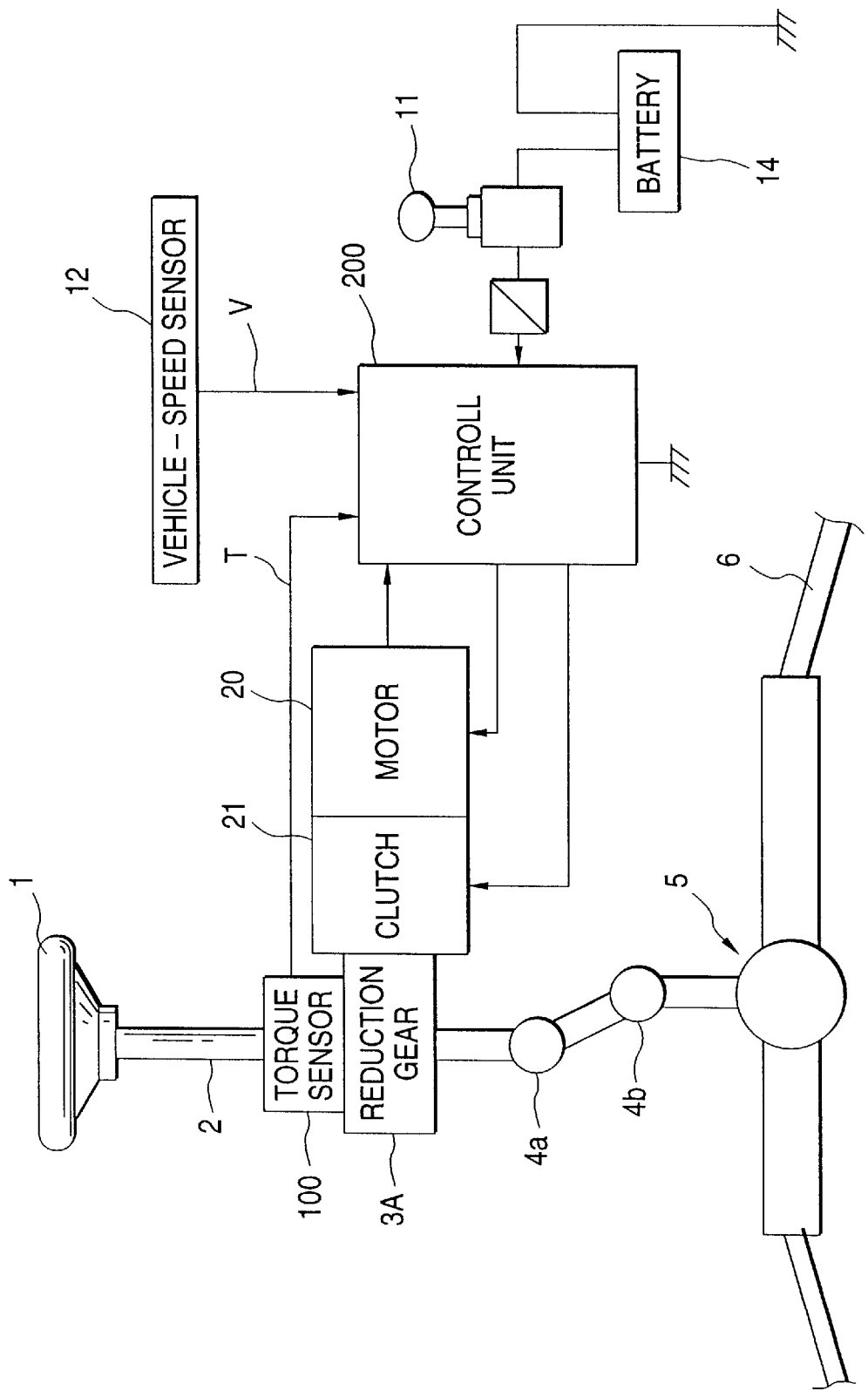
FIG. 15 is a diagram showing a usual structure of an electric power steering apparatus.
Figure 16:
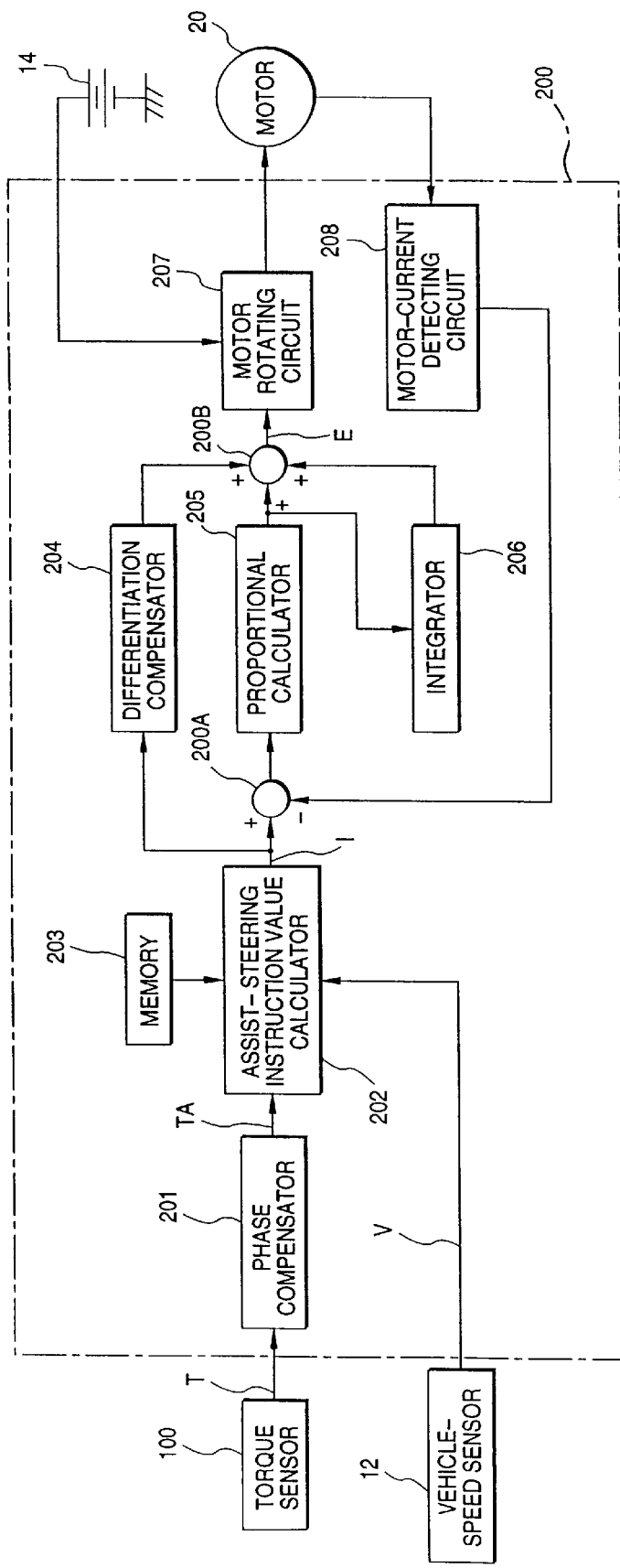
FIG. 16 is a block diagram showing an example of a control unit of the electric power steering apparatus.

FIGS. 1 to 3 show an example of a structure in which a torque sensor 100 according to the present invention is applied to an electric power steering apparatus for a vehicle. Referring to FIG. 1 which shows a cross sectional structure of the overall electric power steering apparatus, a housing 101 accommodates an input shaft 2 (see FIG. 15) and an output shaft 3 (corresponding to reduction gear 3A shown in FIG. 15) connected to each other through a torsion bar 102. The input shaft 2 is rotatively supported by a bearing located on the side of the steering wheel (not shown). The output shaft 3 is rotatively supported by bearings 103a and 103b. The input shaft 2, the output shaft 3 and the torsion bar 102 are coaxially disposed. The input shaft 2 and the torsion bar 102 are connected to each other through a sleeve 2A to which ends of the input shaft 2 and the torsion bar 102 are spline-connected. Another end of the torsion bar 102 is spline-connected considerably inward in the output shaft 3. Each of the input shaft 2 and the output shaft 3 is made of a magnetic material, such as iron. A steering wheel 1 (see FIG. 15) is rotatively and integrally joined to the right-hand end of the input shaft 2. The left-hand end of the output shaft 3 is connected to tie rods 6 through the reduction gear 3, universal joints 4a and 4b and a pinion-and-rack mechanism 5 (see FIG. 11). Therefore, steering force generated when a driver steers the steering wheel 1 is allowed to pass through the input shaft 2, the torsion bar 102, the output shaft 3 and the steering apparatus so as to be transmitted to the wheels which must be steered.

The sleeve 2A secured to the end of the input shaft 2 has a length with which the outer surface of the end of the output shaft 3 is covered. A plurality of projections 2a elongated in the axial direction are formed on the inner surface of a portion of the sleeve 2A which covers the outer surface of the end of the output shaft 3. A plurality (the same number as that of the projections 2a) of grooves 3a elongated in the axial direction are formed in the outer surface of the output shaft 3 opposite to the projections 2a. The projections 2a and the grooves 3B are loosely engaged to one another in the circumferential direction. Thus, relative rotation between the input shaft 2 and the output shaft 3 exceeding a predetermined range (for example, about ±5 degrees) can be prevented. A worm wheel 103, which is coaxially and integrally rotated with the output shaft 3, is fitted to the output shaft 3 from an outer position. A resin engagement portion 103a of the worm wheel 103 and a worm 20b formed on the outer surface of an output shaft 20a of a motor 20 are engaged to each other. Therefore, the rotational force of the motor 20 is transmitted to the output shaft 3 through the output shaft 20a, the worm 20b and the worm wheel 103. When the rotational direction of the motor 20 is arbitrarily switched, assist steering torque is transmitted to the output shaft 3.

A cylindrical member 104 having a thin wall is secured to the sleeve 2A integrally in the rotational direction such that the cylindrical member 104 is positioned adjacent to the outer surface of the output shaft 3 and the output shaft 3 is covered, the sleeve 2A being formed integrally with the input shaft 2 . That is, the cylindrical member 104 is made of a conductive and non-magnetic material (for example, aluminum). As shown in FIG. 2, a portion of the cylindrical member 104 which covers the output shaft 3 and which is adjacent to the sleeve 2A has a plurality of rectangular windows 104a formed apart from one another at the same intervals in the circumferential direction. A portion of the cylindrical member 104 apart from the sleeve 2A has a plurality of rectangular (the same shape as that of each of the windows 104a) windows 104b formed apart from one another at the same intervals such that the phases of the windows 104b are shifted from those of the windows 104a by 180 degrees. A plurality of grooves 3B extending in the axial direction and each having a substantially rectangular cross sectional shape are formed in a portion of the output shaft 3 covered with the cylindrical member 104.

As shown in FIGS. 3 and 4, an assumption is made that an angle obtained by dividing the outer surface of the cylindrical member 104 into N sections (in this embodiment, N=9) in the circumferential direction is one periodical angle θ (=360/N which and θ=40 degrees in this embodiment). In the portion of the cylindrical member 104 adjacent to the sleeve 2A, a region from an end of the one periodical angle θ for an angle of a degrees are formed into the windows 104a. A portion corresponding to a residual angle of b degrees (=θ−a) is closed. Moreover, the phases of the windows 104b are shifted from those of the windows 104a by a half period (θ/2). In the portion of the cylindrical member 104 distant from the sleeve 2A, a region from an end of the one periodical angle θ for an angle of a degrees are formed into the windows 104b. A portion corresponding to a residual angle of b degrees (=θ−a) is closed. In addition, the width of each projection 3C having a projection cross sectional shape between the grooves 3B in the circumferential direction is c degrees. The width of each groove 3B in the circumferential direction is d degrees. A range in which the cylindrical member 104 and the output shaft 3 (between the input shaft 2 and the output shaft 3) are able to relatively rotate is e degrees. When the torsion bar 102 is not twisted (when the steering torque is zero), for example, when c is 20 degrees, the central portion of the width of the window 104a in the circumferential direction and an end (an edge of the projection 3C) of the groove 3B in the circumferential direction overlap each other, as shown in FIG. 3. As shown in FIG. 4, the central portion of the width of the window 104a in the circumferential direction and an end (an edge of the projection 3C) of the groove 3B in the circumferential direction overlap each other. Therefore, a state of overlap between the windows 104a and the grooves 3B and that of overlap between the windows 104b and the grooves 3B are opposite to each other in the circumferential direction. The central portions of the windows 104a and 104b and those of the widths of the grooves 3B in the circumferential direction are shifted from one another by θ/4. Note that this embodiment has a structure that b>a, d>c and e<θ/4.

The cylindrical member 104 is surrounded by a yoke 112 around which coils 110 and 111 are wound, the coils 110 and 111 having the same specifications. That is, the coils 110 and 111 are disposed coaxially with the cylindrical member 104. The coil 110 is wound around the yoke 112 such that the portion in which the windows 104a are formed is surrounded. The coil 111 is wound around the yoke 112 such that the portion in which the windows 104b are formed is surrounded. The yoke 112 is secured to the housing 101. A space in the housing 101 in which the worm wheel 103 is disposed and a space in which the yoke 112 is disposed are isolated from each other by an oil seal 113. Thus, lubricating oil which is supplied to an engaging portion between the worm wheel 103 and the worm 20b is not introduced into the portion including the yoke 112.

Figure 5:
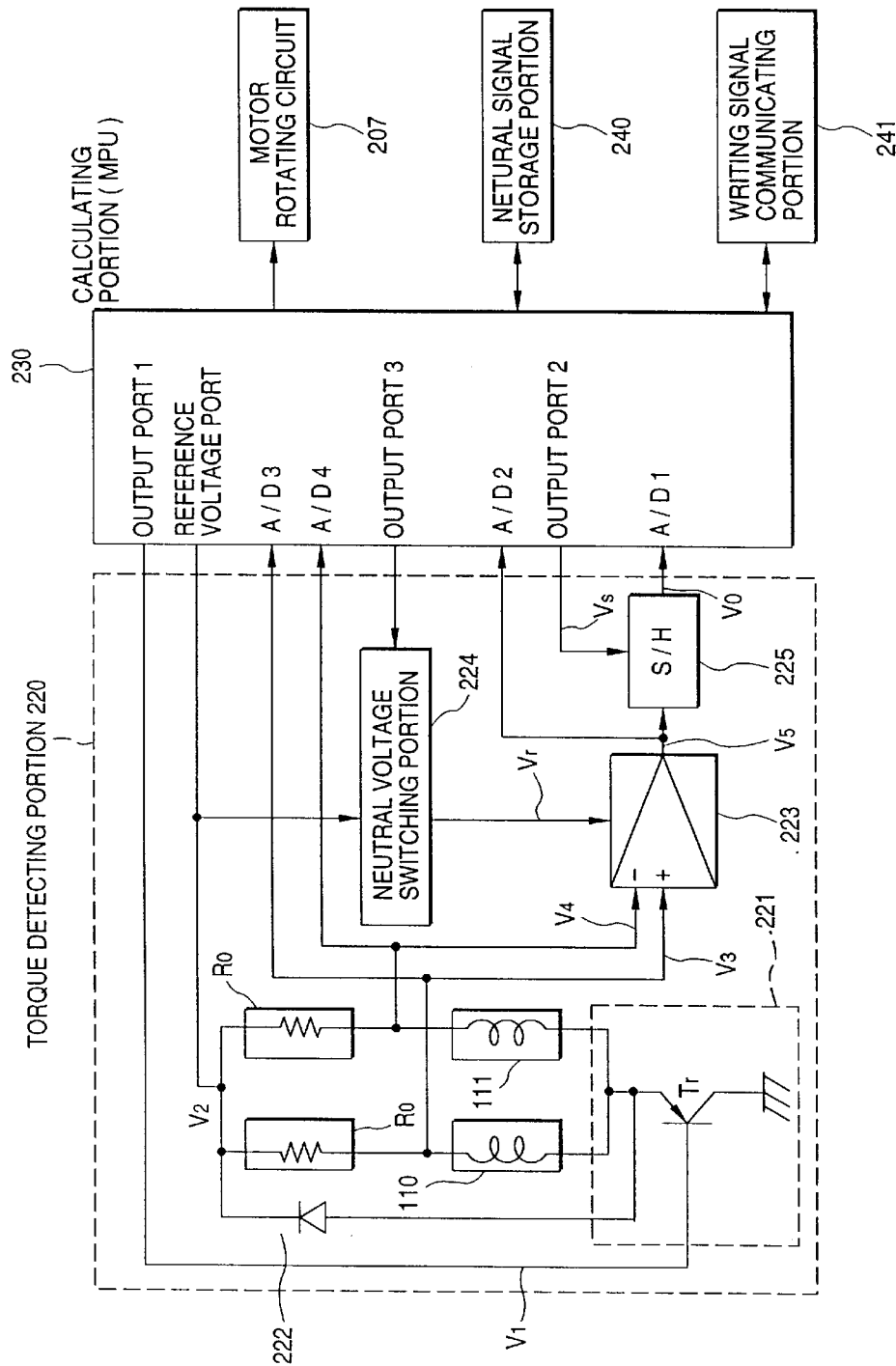
FIG. 5 is a circuit diagram showing a motor control circuit according to an embodiment of the present invention.

The coils 110 and 111 are connected to a control unit 200 mounted on a control substrate 210 disposed in a sensor case 114. Of course, it is possible to dispose the control unit 200 distributed over a plurality of unit pieces of the control substrate 210 (not shown). As shown in FIG. 5, the motor control circuit incorporates a torque detection portion 220 and a calculating portion 230. The motor control circuit has two resistors Ro, in series connected to the coils 110 and 111 and having the same resistance value. The coils 110 and 111 and the resistors Ro constitute a bridge circuit. In the bridge circuit, the connection portion between the coils 110 and 111 are grounded through a coil operating portion 221 comprising a PNP transistor Tr. The connection portion between the resistors Ro is connected to reference voltage V2 of a calculating portion (constituted by an interface circuit including an MPU, an A/D converter, a D/A converter and so forth) 230. The connection portion between the coils 110 and 111 is connected to the resistors Ro through a diode 222 for regenerating an electric current if inverse electromotive force is caused in the coils 110 and 111. A gate of the transistor Tr of the coil operating portion 221 is supplied with control voltage V1 from the output port 1 of the calculating portion 230. The control voltage V1 is rectangular-wave voltage as shown in FIG. 6A. The output interval of the rectangular wave is in synchronization with sampling clocks. Since the transistor Tr of the coil operating portion 221 is the PNP transistor, the control voltage V1 is negative logic voltage which falls from "1" to "0" at timing at which the transistor is turned on and rises from "0" to "1" at timing at which the transistor Tr is turned off. The reference voltage V2 which is applied from the reference voltage port through the resistors Ro and the coils 110 and 111 to the coil operating portion 221 is constant voltage as shown in FIG. 6B which is in synchronization with ON/OFF operation of the transistor Tr.

An output voltage V3 which is the voltage between the coil 110 and the resistor Ro and which is one of output voltages of the bridge circuit and output voltage V4 which is the voltage between the coil 111 and the resistor Ro and which is another output voltage are applied to a differential amplifier 223. Moreover, the voltages V3 and V4 are applied to terminals A/D3 and A/D4 for the A/D of the calculating portion 230. Note that the differential amplifier 223 is applied with neutral voltage Vr from a neutral-voltage switch portion 224. The differential amplifier 223 produces an output of voltage V5 expressed by the following Equation (1) on an assumption that the amplification factor is G:

$$V5 = G \times (V3 - V4) + Vr \qquad (1)$$

The output voltage V5 from the differential amplifier 223 is applied to the terminal A/D2 of the calculating portion 230. Moreover, the output voltage V5 is held by a sample hold circuit 225 in response to hold signal Vs supplied from the calculating portion 230. Thus, output voltage Vo at a predetermined sampling is applied to the terminal A/D1 of the calculating portion 230. The calculating portion 230 supplies, to the sample hold circuit 225, a short pulse hold signal Vs formed as shown in FIGS. 7A-3 to 7C-3 such that the hold signal Vs rises simultaneously with falling of the control voltage V1 and falls after a predetermined time has elapsed. The sample hold circuit 225 holds the voltage V5 at the falling of the hold signal Vs as output voltage Vo. Then, the calculating portion 230 A/D-converts the voltage Vo. A neutral-signal storage portion 240 comprising a nonvolatile memory for storing a neutral signal immediately after assembly is connected to the calculating portion 230. Moreover, a writing-signal communication portion (a serial communication port or a general-purpose input/output port) 241 for receiving a writing signal which must be stored in the neutral-signal storage portion 240 after the assembly has been completed is connected to the calculating portion 230.

The last transition timing of the hold signal Vs is in a period in which the output voltages V3 and V4 in a transition state are being applied to the differential amplifier 223. Specifically, a moment of time at which time constant τ, which is determined by the inductance of each of the coils 110 and 111 and the resistors Ro, has elapsed from the last transition of the control voltage V1 is made to be the last transition timing for the hold signal Vs. The reason why the time constant τ is employed is that the output voltage V5 is attempted to be held at a moment of time at which the difference is made to be largest if the output voltages V3 and V4 have the difference. Therefore, when the hold signal Vs is varied in a period up to the time constant τ, also the gain of the output of the torque sensor can be adjusted. The neutral-signal storage portion 240 may be a memory including a backup power source, such as a battery.

The calculating portion 230 calculates the direction and magnitude of the relative rotational displacement of the input shaft 2 and the cylindrical member 104 in accordance with the voltage Vo applied from the sample hold circuit 225. Then, the calculating portion 230 multiplies a result of the calculation with a proportional constant so as to obtain steering torque generated at the steering system. Then, the calculating portion 230 controls the motor rotating circuit 207 in such a manner that operating current I for generating the assist torque is supplied to the motor 20 in accordance with a result of the calculation. FIGS. 8A to 8C show timing in a usual operation. FIG. 8A shows timing of the control voltage V1 for operating the coil, where time T1 is time for which the coil is not operated. FIG. 8B shows coil voltage corresponding to the applied control voltage V1. FIG. 8C shows the operation of the sample hold circuit 225 structured such that hold time T2 is used as time for which the CPU performs calculations and time for which the motor is controlled. At time t1, a sensor output is A/D-converted. The calculating portion 230 is supplied with information of vehicle speed V from a vehicle-speed sensor 12. In accordance with the vehicle speed V, the calculating portion 230 determines whether or not the vehicle is running at high speed. When the vehicle is running at high speed, the calculating portion 230 determines that the assist steering torque is not required. Thus, the calculating portion 230 inhibits control of the motor rotating circuit 207.

The operation of this embodiment will now be described.

When the steering system is in a straight-ahead state and thus the steering torque is zero, the input shaft 2 and the output shaft 3 do not relatively rotate. Also the output shaft 3 and the cylindrical member 104 do not relatively rotate. If rotational force is generated at the input shaft 2 when the steering wheel 1 has been operated, the rotational force is transmitted to the output shaft 3 through the torsion bar 102. At this time, resistance corresponding to the frictional force between the wheels which must be steered and the surface of the road and the frictional force caused from engagement of the gears of the steering apparatus are caused at the output shaft 3. Therefore, relative rotation causing the output shaft 3 to be delayed takes place between the input shaft 2 and the output shaft 3 because the torsion bar 102 is twisted. If the worm wheel 103 has no window, passing of an alternating current to the coil to generate an alternating field in the coil causes an eddy current passing in a direction opposite to the direction of the coil current to be generated on the outer surface of the cylindrical member 104 because the cylindrical member 104 is made of the conductive and non-magnetic material. When the magnetic field generated by the eddy current and the magnetic field generated by the coil are superimposed, the magnetic field in the cylindrical member 104 is compensated.

When the windows 104a and 104b are provided for the cylindrical member 104, an eddy current generated on the outer surface of the cylindrical member 104 cannot pass along the outer surface of the cylindrical member 104 because the windows 104a and 104b are formed. Therefore, the eddy current passes along the end surfaces of the windows 104a and 104b so as to be introduced into the inner portion of the cylindrical member 104. Then, the eddy current is passed on the inner surface of the cylindrical member 104 in the same direction as the direction of the coil current. Then, the eddy current passes along the end surfaces of the adjacent windows 104a and 104b to return to the outer surface of the cylindrical member 104. Thus, a loop which is passed as described above is formed. That is, a state is realized in which eddy current loops are periodically ($\theta=360/N$) formed in the circumferential direction. The magnetic fields generated by the coil current and the eddy current are superimposed so that a magnetic field is formed which has periodical strong and weak portions in the circumferential direction and the gradient of which is reduced toward the central portion. The intensity of the magnetic field in the circumferential direction is intensified in the central portions of the windows 104a and 104b which are greatly affected by the adjacent eddy currents. On the other hand, the magnetic field is weakened in the portions shifted by a half period ($\theta/2$) from the central portions. A shaft 3 made of a magnetic material is coaxially disposed on the inside of the cylindrical member 104. The shaft 3 is provided with grooves 3B and projections 3C at the same intervals as those of the windows 104a and 104b. The magnetic member disposed in the magnetic field is magnetized so that the magnetic member generates spontaneous magnetization (a magnetic flux). The amount of the spontaneous magnetization is enlarged in proportion to the intensity of the magnetic field until the amount is saturated.

Therefore, the spontaneous magnetization of the shaft 3 is enlarged/reduced in accordance with the relative phase with respect to the cylindrical member 104 by dint of the magnetic field generated by the cylindrical member 104 and having periodical strong and weak portions in the circumferential direction and having the gradient in the radial direction.

The phase in which the spontaneous magnetization is maximized is a state in which the central portions of the windows 104a and 104b and the centers of the projections 3C coincide with one another. Also the inductance of the coil is enlarged/reduced in accordance with the enlargement/reduction in the spontaneous magnetization. The change occurs in the form of a sine-wave-like shape. In a state in which no torque is acted, a state is realized which is shifted by ¼ period ($\theta/4$) from the phase at which the spontaneous magnetization (the inductance) is maximized. The phase of a row of the windows adjacent to the sleeve 2A and the phase of another row of the windows are shifted from each other by ½ period ($\theta/2$).

Therefore, if the phases of the cylindrical member 104 and the shaft 3 are made to be different from each other owning to the torque, the inductance of either of the two coils 110 and 111 is enlarged. On the other hand, the inductance of the other coil is reduced at the same rate. When the steering system is at the neutral position and the steering torque is zero, the coils 110 and 111 have the same inductance. Therefore, no difference in the impedance is caused between the coils 110 and 111. Thus, the coils 110 and 111 have the same self-dielectric electromotive force. In the above-mentioned state, the voltage V1 in the form of the rectangular wave as shown in FIG. 6A is applied from the calculating portion 230 to the coil operating portion 221. The voltage V2 in the form of the rectangular wave obtained by inverting the control voltage V1 and shown in FIG. 6B is applied to the coils 110 and 111. As a result, the output voltages V3 and V4 of the bridge circuit have the same transient value as shown in FIG. 7A-1. Since the difference is zero, output voltage V5 of the differential amplifier 223 is maintained at the neutral voltage Vr, as shown in FIG. 7A-2. Therefore, even if the hold signal Vs as shown in FIG. 7A-3 is transmitted, the output voltage Vo of the sample hold circuit 225 is maintained at the neutral voltage Vr, as shown in FIG. 7A-4. As a result, the calculating portion 230 detects a fact that the steering torque of the steering system is zero. Therefore, no output of the operating current I is produced from the motor rotating circuit 207. Thus, needless assist steering torque is not generated at the steering system.

When rightward steering torque is generated, the inductance of the coil 110 is enlarged as the rightward steering torque is enlarged. On the other hand, the inductance of the coil 111 is reduced. As the leftward steering torque is enlarged, the inductance of the coil 110 is reduced. On the other hand, the inductance of the coil 111 is enlarged. When the inductance of each of the coils 110 and 111 is changed as described above, also the impedance of each of the coils 110 and 111 is similarly changed. Also the self-dielectric electromotive force of each of the coils 110 and 111 is similarly changed. Therefore, when rightward steering torque is generated, the output voltage V3 rises more steeply than the output voltage V4, as shown in FIG. 7B-1. It leads to a fact that the output voltages V3 and V4 are made to be different from each other in the transient state, as shown in FIG. 7B-2. The difference (V5) is enlarged in proportion to the generated steering torque. When leftward steering torque is generated, the output voltage V4 rises more steeply than the output voltage V3, as shown in FIG. 7C-1. It leads to a fact that the output voltages V3 and V4 are made to be different from each other in the transient state as shown in FIG. 7C-2. The difference (V5) is enlarged in proportion to the generated steering torque.

As described above, the output voltage V5 of the differential amplifier 223 is greatly changed from the neutral voltage Vr in accordance with the direction and the magnitude of the generated steering torque, as shown in FIGS. 7B-2 and 7C-2. Therefore, when the hold signal Vs is supplied to the sample hold circuit 225 at the timing as shown in FIGS. 7B-3 and 7C-3 and whereby the voltage V5 is held, a hold value of the output voltage Vo higher than the neutral voltage Vr is obtained as shown in FIG. 7B-4 when rightward steering torque has been generated. When leftward steering torque has been generated, a hold value of the output voltage Vo lower than the neutral voltage as shown in FIG. 7C-4 can be obtained.

The calculating portion 230 communicates, to the motor rotating circuit 207, the steering torque based on the supplied output voltage Vo. The motor rotating circuit 207 supplies, to the motor 20, operating current I corresponding to the direction and the magnitude of the steering torque. As a result, the motor 20 generates the rotational force corresponding to the direction and the magnitude of the steering torque generated in the steering system. The rotational force of the motor 20 is transmitted to the output shaft 3 through the worm 20b and so forth. Thus, the output shaft 3 is given the assist steering torque so that the load which must be borne by the driver is reduced.

Even in a structure in which the rectangular-wave voltage V2 is applied to the coils 110 and 111, the differential amplifier 223 and the sample hold circuit 225 hold the difference in the transition voltage between the output voltages V3 and V4 so that the difference is communicated to the calculating portion 230 as the output voltage Vo. Therefore, the direction and the magnitude of the steering torque which is being generated in the steering system can be detected. Thus, assist steering torque corresponding to the detected values can be generated. When the structure in which the coils 110 and 111 are operated by the rectangular-wave voltage V2 is employed, an electric current is passed through each of the coils 110 and 111 in only a period in which the voltage V2 is being raised. Therefore, if the duty ratio of the waveform of the voltage V2 is sufficiently reduced, power consumption can significantly be reduced. In the structure according to this embodiment, only the output voltage Vo obtained when a sufficiently large difference is made between the output voltages V3 and V4 in the transition state is required to detect the steering torque. To obtain the output voltage Vo, only rise of the voltage V2 is required until the time constant τ is elapsed from falling of the output voltage V1. Therefore, the transistor Tr is required to be turned on for only a period of time somewhat longer than the time constant τ including a safety ratio. Thus, the duty ratio of the voltage V2 can significantly be reduced (to, for example, about 5%). As a result, duration of electric current flow through each of the coils 110 and 111 can considerably be shortened. Therefore, current consumption can be reduced and thus an economic advantage can be realized. Also heat generation can be reduced. If the heat generation is reduced, occurrence of failures can be prevented. Since application of the control voltage V1 which is on-off controlled by the calculating portion 230 to the transistor Tr enables the coils 110 and 111 to be operated with the rectangular-wave voltage $V_2$, the number of electronic parts can be reduced as compared with the structure in which the sine wave is used to operate the coils. Moreover, each electronic part is not required to be manufactured considerably accurately. Therefore, the cost can be reduced.

The present invention has the structure that the neutral-signal storage portion 240 is connected to the calculating portion 230. Moreover, the initial value in the assembly state is stored in the neutral-signal storage portion 240 through the writing-signal communication portion 241 after the assembly has been completed. When input torque is zero (see FIGS. 7A-1 to 7A-4) after the assembly has been completed, the output voltage Vo of the sample hold circuit 225 can be made to be the neutral voltage Vr (=2.5 V which is a central value of A/D). In actual, a dimensional error of a part, such as a shaft, an angular error caused during assembly and a part tolerance of the torque detection portion 220 cause the output voltage Vo to be (2.5+α) V on an assumption that initial deviation is α. Therefore, there is a possibility that a deviation range ±α caused from initial deviation a is deviated to be higher than a voltage range for use. In the above-mentioned state, a signal for operating the neutral-voltage switch portion 224 to cause the output voltage to satisfy a soft adjustment permitted range previously set to the calculating portion 230 is transmitted through the output port 3 from the calculating portion 230 by external communication. Moreover, a storage command for storing an output voltage (2.5±α1) V, which is an output voltage realized when the voltage has satisfied the predetermined soft adjustment permitted range, is transmitted through the writing-signal communication portion 241 as an offset value. When the calculating portion 230 has received the storage command, the calculating portion 230 stores the assembly initial value in the neutral-signal storage portion 240 as a neutral signal. Then, the function of the writing-signal communication portion 241 is turned off, and then the system is operated. Thus, the initial value stored in the neutral-signal storage portion 240 is used as the neutral (correction of ±α1) for the differential amplifier 223 when the operating current I is calculated. As a result, an influence of the deviation (±α) of neutral caused from initial assembly allowance can be prevented and the complicated mechanical neutral adjustment can be omitted when the system is operated.

Figures 9A, 9B, 9C:
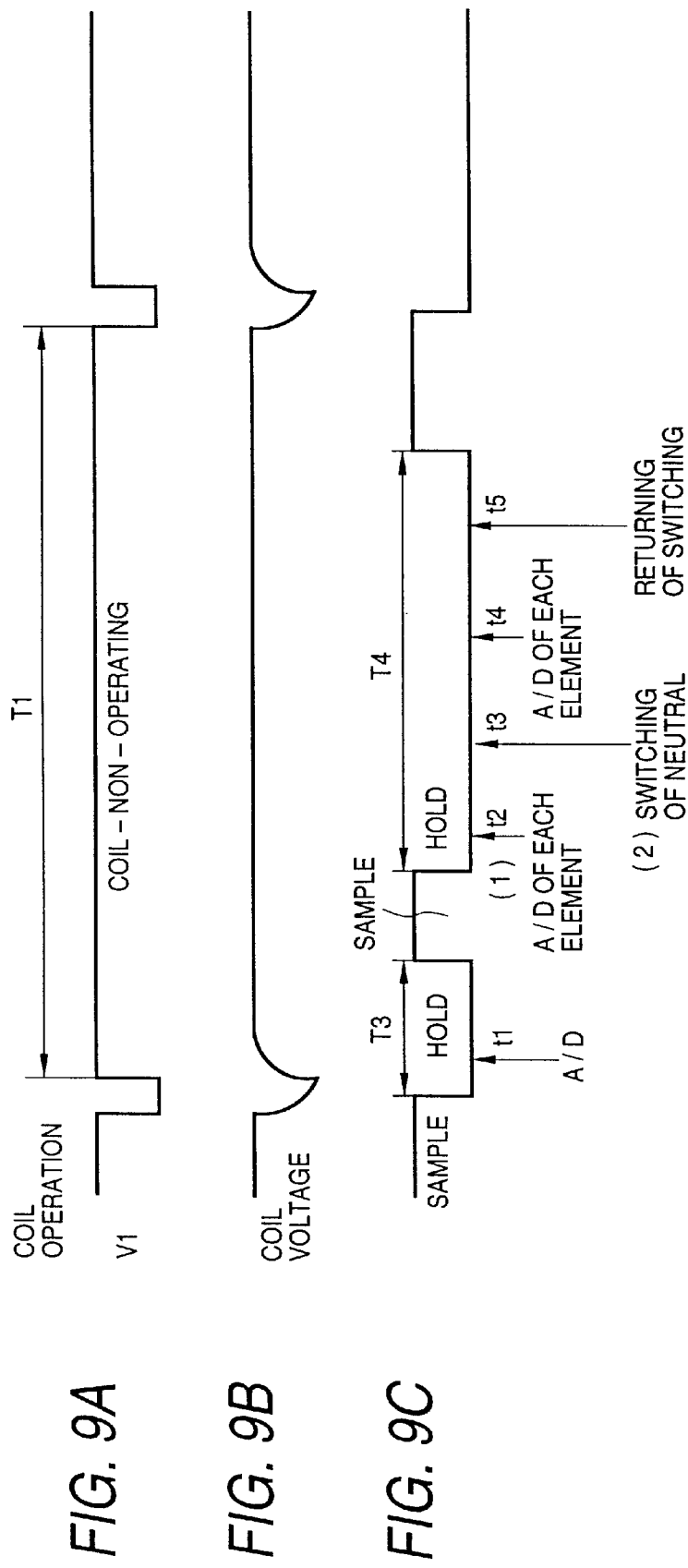
FIGS. 9A to 9C are timing charts of an example of the operation which is performed when a failure has been detected.
Figure 10:
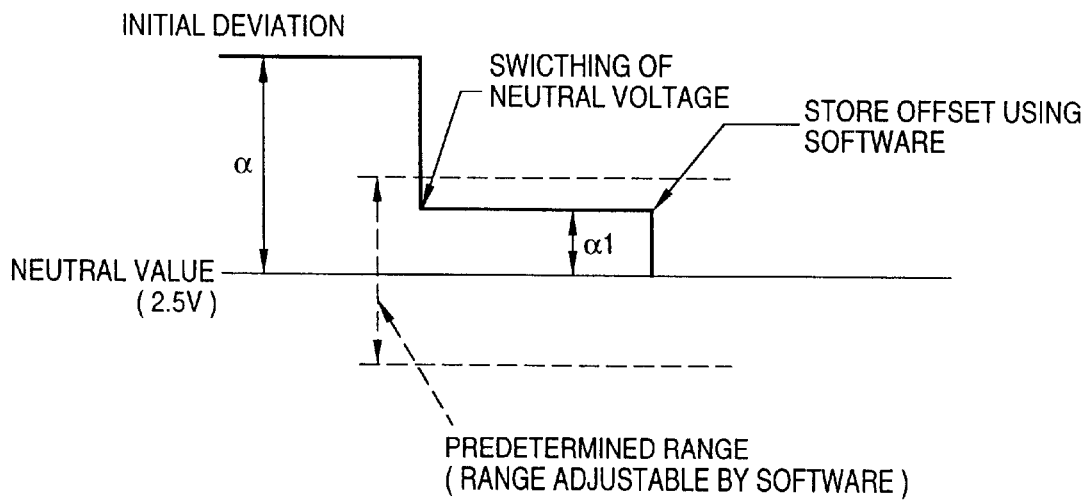
FIG. 10 is a graph showing a waveform for describing the operation according to the present invention.

Moreover, also data items of each output voltage and the switch portion are stored in the neutral-signal storage portion 240 to determine a failure of each portion. As shown in FIG. 9, timing at which torque is detected in accordance with change in the transition voltage is set to be predetermined arbitrary intervals (several millimeter seconds) under control of the calculating portion 230. The coils are operated for tens of microseconds and a major portion of the period of time is time T1 in which the coils are not operated. In the coil non-operation time T1 in which the coils are not operated, sampling is performed at intervals of time T3 and time T4, as shown in FIG. 9C. Moreover, the hold value is A/D-converted at time t1 in time T3 so that a torque output is obtained. In time t2 after next sampling has been performed, a result of the A/D conversion of each portion is obtained so as to be compared with the initial value stored in the neutral-signal storage portion 240. If the coil voltages V3 and V4 are different from the initial value, a determination is made that grounding of the coil takes place or that the coil operating transistor is conducted. If the output voltage V5 of the differential amplifier 223 is different from the initial value, a determination is made that an abnormality of the neutral voltage, an abnormality of the differential amplifier or an abnormality of the A/D conversion portion takes place. If the output voltage Vo of the sample hold circuit 225 is different from the initial value, a determination is made that an abnormality of the sample hold circuit or that of the A/D conversion portion takes place.

At next time t3, the neutral voltage is switched by the neutral-voltage switch portion 224. Then, the A/D value of each portion at next time t4 is compared with the A/D value of each portion at time t2. If the output voltage V5 of the differential amplifier 223 is not a normal value (offset voltage realized by switching), a determination is made that the neutral-voltage switch portion 224 is abnormal. If the output voltage Vo of the sample hold circuit 225 is not a normal value (output voltage Vo at time t2), a determination is made that the sample hold circuit 225 is abnormal.

Next, another embodiment of the present invention will be described with reference to FIGS. 11 to FIG. 14.

Figure 11:
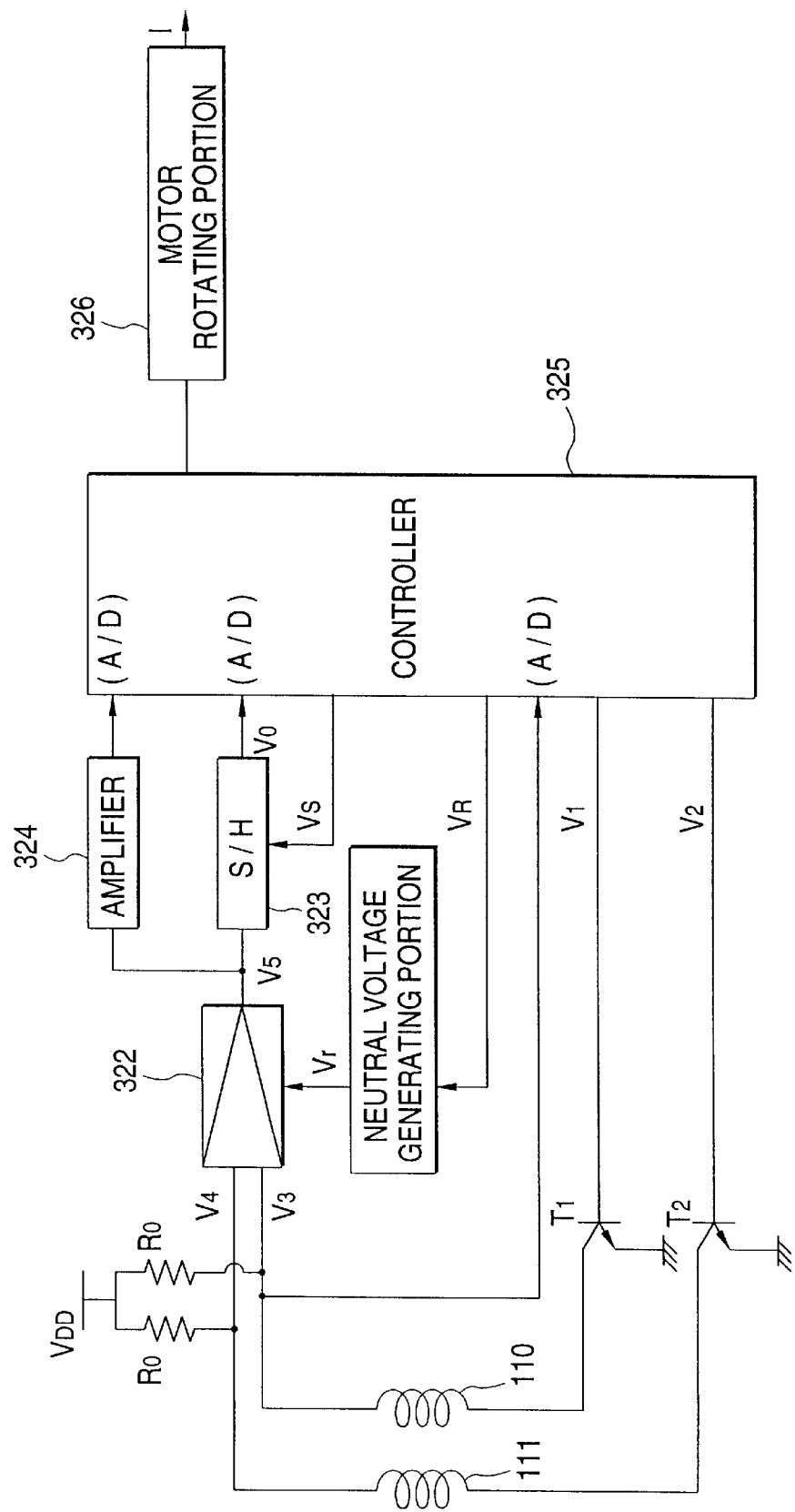
FIG. 11 is a circuit diagram of a motor control circuit according to another embodiment of the present invention.

A motor control circuit shown in FIG. 11 is formed on the control substrate 210 in the sensor case 114 as similar to the motor control circuit shown in FIG. 5. Of course, it is possible to dispose the motor control circuit distributed over a plurality of unit pieces of the control substrate 210 (not shown).

The motor control circuit in FIG. 11 has two resistors Ro, in series, connected to the coils 110 and 111 and having the same resistance value. The coils 110 and 111 and the resistors Ro constitute a bridge circuit. In the bridge circuit, the connection portion between the resistors Ro is connected to power source $V_{DD}$. An end of the coil 110 opposite to the electric resistor Ro can be connected to the ground through an NPN transistor $T_1$. An end of the coil 111 opposite to the electric resistor Ro can be connected to the ground through an NPN transistor $T_2$. That is, when the transistors $T_1$ and $T_2$ are turned on/off, each of the coils 110 and 111 can independently be connected to the ground or the connection of each of the coils 110 and 111 with the ground can be disconnected. Note that a so-called flywheel diode is omitted from illustration.

The gates of the transistors $T_1$ and $T_2$ are applied with control voltages $V_1$ and $V_2$ from a controller 325 including an interface circuit having a microprocessor, an A/D converter, a D/A converter and so forth (not shown).

Figure 12:
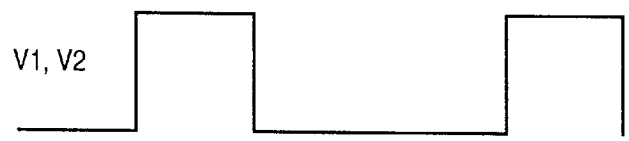
FIG. 12 is a graph showing a waveform of voltage which is applied from a controller to each of coils in FIG. 11.

The control voltages $V_1$ and $V_2$ are voltages each of which varies in a rectangular wave, as shown in FIG. 12. The output interval of the rectangular waves is in synchronization with sampling clocks of a controller 325. Since the transistors $T_1$ and $T_2$ are the NPN transistors, the control voltages $V_1$ and $V_2$ are so-called positive logic voltages which rise from logical value "0" to "1" at timing at which the transistors $T_1$ and $T_2$ are turned on and fall from logical value "1" to "0" at timing at which the transistors $T_1$ and $T_2$ are turned off.

An output voltage $V_3$ which is the voltage between the coil 110 and the resistor Ro and which is one of output voltages of the bridge circuit and output voltage $V_4$ which is the voltage between the coil 111 and the resistor Ro and which is another output voltage are applied to a differential amplifier 322.

Note that the differential amplifier 322 is applied with neutral voltage Vr from a neutral-voltage switch portion 322A which generates neutral voltage Vr in accordance with control voltage $V_R$ applied from the controller 325. The differential amplifier 322 produces an output of output voltage $V_5$ expressed by the aforementioned Equation (1).

Assuming that the neutral voltage Vr is 2.5 V, the output voltage $V_5$ is changed in an amplitude range, the midpoint of which is 2.5 V, and which corresponds to the difference between the output voltages $V_3$ and $V_4$.

The output voltage $V_5$ of the differential amplifier 322 is held by the sample hold circuit 323 so that the output voltage $V_5$ is applied to the controller 325 as output voltage Vo at predetermined sampling timing.

The controller 325 supplies, to the sample hold circuit 323, hold signal Vs which rises simultaneously with the first transition of the control voltages $V_1$ and $V_2$ and falls after a predetermined time has been elapsed from the rise and which is formed in a short pulse-shape voltage as shown in FIGS. 13A-3 to 13C-3. The sample hold circuit 323 holds the output voltage $V_5$ at the last transition of the hold signal Vs as the output voltage Vo.

The last transition timing (that is, the width of the pulse wave serving as the hold signal Vs) of the hold signal Vs is in a period in which the output voltages $V_3$ and $V_4$ in a transition state (in a changing state) are being applied to the differential amplifier 322. Specifically, a moment of time at which time constant τ, which is determined by the inductance of each of the coils 110 and 111 and the resistors Ro, has elapsed from the first transition of the control voltage $V_1$ (rising of the $V_1$) is made to be the last transition timing for the hold signal Vs. The reason why the time constant τ is employed is that the output voltage $V_5$ is attempted to be held at a moment of time at which the difference is made to be largest if the output voltages $V_3$ and $V_4$ have the difference.

On the other hand, the output voltage $V_5$, which is applied to the sample hold circuit 323, is as well as applied to the amplifier 324. The output voltage $V_5$ is amplified by the amplifier 324, followed by supplying the output voltage $V_5$ to the controller 325.

The controller 25 A/D-converts and reads the output voltage $V_5$ amplified by the amplifier 324 in synchronization with the last transition of the hold signal Vs transmitted at the detection timing of the steering torque. In accordance with the read output voltage $V_5$, the controller 325 calculates the direction and magnitude of the relative rotational displacement of each of the input shaft 2 and the cylindrical member 104. Then, the controller 325 multiplies a result of the calculation with a predetermined proportional constant so as to obtain the steering torque generated at the steering system. Then, the controller 325 controls the motor rotating portion 326 in such a manner that operating current I for generating the assist steering torque is supplied to the electric motor 20 in accordance with a result of the calculation, the motor rotating portion 326 being constituted by a power transistor (not shown) and so forth.

The controller 325 is supplied with a vehicle-speed detection signal from a vehicle-speed sensor (not shown). In response to the vehicle-speed detection signal, the controller 325 determines whether or not the vehicle is running at high speed. When the vehicle is running at high speed, the controller 325 determines that the assist steering torque is not required. Thus, the controller 325 inhibits control of the motor rotating portion 326. Also a current detection signal (not shown) for feedback-control an electric current to be supplied to the electric motor 20 is supplied to the controller 325.

Also an output voltage $V_3$ which is one of the outputs of the bridge circuit is directly applied to the controller 325. The controller 325 A/D-converts the output voltage $V_3$ at an arbitrary timing.

The rectangular-wave control voltages $V_1$ and $V_2$ are simultaneously transmitted to the transistors $T_1$ and $T_2$ from the controller 325 at timing at which the steering torque is detected. The output timing intervals of the control voltages $V_1$ and $V_2$ are relatively long, as shown in FIG. 14A. In the period of time, time (non-torque-detection timing) in which no torque is detected is relatively long. The width of each of the rectangular waves of the control voltages $V_1$ and $V_2$ is tens of microseconds.

As indicated with a solid line shown in FIG. 14A, the controller 325 performs A/D conversion at timing ti synchronized with falling of each of the rectangular-wave control voltages $V_1$ and $V_2$ so as to read the output voltage $V_5$. Thus, the controller 325 controls generation of the assist steering torque.

Moreover, the controller 325 performs a variety of abnormality detecting processes at the non-toque-detection timing which is relatively long time.

In this embodiment, three types of abnormality detecting processes are performed at different execution timing.

A first abnormality detecting process is performed in synchronization with timing $t_2$ immediately after only sample holding is performed without outputs of the control voltages $V_1$ and $V_2$, as shown in FIG. 14C. Specifically, A/D conversion is performed at timing t2 so as to read output voltages $V_3$, Vo and $V_5$. In accordance with the output voltage $V_3$ (a normal value of the output voltage $V_3$ is the voltage of the power source $V_{DD}$), an abnormality confirming process is performed (which includes detection of short circuit of the coils 110 and 111 with the ground, confirmation of conduction of each of the transistors $T_1$ and $T_2$ and confirmation of an abnormality of the A/D converter for the output voltage $V_3$). The output voltage Vo and a stored initial value are compared with each other so that an abnormality confirmation process is performed (which includes confirmation of an abnormality of the differential amplifier 322, confirmation of an abnormality of the neutral-voltage generating portion 322A and confirmation of an abnormality of the A/D converter for the output voltage Vo). The output voltage $V_5$ and a stored initial value are compared with each other so that an abnormality detecting process is performed (which includes confirmation of an abnormality of the amplifier 324, confirmation of an abnormality of the neutral-voltage generating portion 322A and confirmation of an abnormality of the A/D converter for the output voltage $V_5$).

A second abnormality detecting process is performed in synchronization with timing $t_3$ to $t_5$ in a state in which holding of the sample hold circuit 323 is maintained, as shown in FIG. 14C. Specifically, the neutral voltage Vr is, at timing $t_3$, switched to a value which is different from that at usual torque detecting timing. At timing $t_4$, each of A/D conversion process is performed to read the output voltages Vo and $V_5$. The output voltage $V_6$ and the output voltage Vo read at timing $t_2$ are compared with each other so that an abnormality detecting process is performed (confirmation of an abnormality of the sample hold circuit 323). The output voltage $V_5$ and a sum of a stored initial value and offset voltage corresponding to switching are compared with each other so that an abnormality detecting process is performed (confirmation of the neutral-voltage generating portion 322A). At timing $t_5$, the neutral voltage Vr is returned to a value at usual torque detecting timing.

A third abnormality detecting process is performed at timing $t_6$ and $t_7$ shown in FIG. 14C. Specifically, at timing $t_6$ an output of only rectangular-wave control voltage $V_2$ is produced as indicated by a dashed line shown in FIG. 14A. At timing $t_7$ synchronized with falling of the control voltage $V_2$, the output voltage $V_3$ is A/D-converted and read. In accordance with whether or not the output voltage $V_3$ is the same as the power source $V_{DD}$, short circuit between the coils 110 and 111 is detected.

All of the first to third abnormality detecting processes may be performed at one non-torque-detection timing. The processes may be performed by a plurality of operations which are performed at a plurality of non-torque-detection timing. As an alternative to this, all or either of the first to third abnormality detecting process may be performed such that non-torque-detection timing at which all or either of the first to third abnormality detecting processes is performed and non-torque-detection timing at which the first to third abnormality detecting processes are not performed are repeated at predetermined intervals.

As aforementioned, when the steering system is at the neutral position and the steering torque is zero, the coils 110 and 111 have the same inductance. Therefore, no difference in the impedance is caused between the coils 110 and 111. Thus, the coils 110 and 111 have the same self-dielectric electromotive force.

In the above-mentioned state, the control voltages $V_1$ and $V_2$ as indicated with a solid line shown in FIG. 12 are applied to the transistors $T_1$ and $T_2$ from the controller 325. Thus, the output voltages $V_3$ and $V_4$ of the bridge circuit have the same transition values, as shown in FIG. 13A-1.

Thus, the output voltage $V_5$ of the differential amplifier 322 is maintained at the neutral voltage Vr, as shown in FIG. 13A-2. As shown in FIG. 13A-4, also the output voltage Vo of the sample hold circuit 323 is maintained at the neutral voltage Vr.

As a result, the controller 325 detects a fact that the steering torque of the steering system is zero. Therefore, no operating current I is not supplied from the motor rotating portion 326. Thus, needless assist steering torque is not generated at the steering system.

When rightward steering torque is generated, the inductance of the coil 110 is enlarged as the rightward steering torque is enlarged as compared with the case where the steering torque is zero. On the other hand, the inductance of the coil 111 is reduced. As the leftward steering torque is enlarged, the inductance of the coil 110 is reduced. On the other hand, the inductance of the coil 111 is enlarged.

When the inductance of each of the coils 110 and 111 is changed as described above, also the impedance of each of the coils 110 and 111 is similarly changed. Also the self-dielectric electromotive force of each of the coils 110 and 111 is similarly changed.

Therefore, when rightward steering torque is generated, the output voltage $V_3$ falls more quickly than the output voltage $V_4$, as shown in FIG. 13B-1. It leads to a fact that the output voltages $V_3$ and $V_4$ are made to be different from each other in the transient state. The difference is enlarged in proportion to the generated steering torque. When leftward steering torque is generated, the output voltage $V_4$ falls more quickly than the output voltage $V_3$, as shown in FIG. 13C-1. It leads to a fact that the output voltages $V_3$ and $V_4$ are made to be different from each other in the transient state. The difference is enlarged in proportion to the generated steering torque.

As described above, the output voltage $V_5$ of the differential amplifier 322 is greatly changed from the neutral voltage Vr in accordance with the direction and the magnitude of the generated steering torque. Also change in the same-phase component of the self-inductance caused from disturbance, such as temperature, is canceled by the differential amplifier 322.

The controller 325 obtains steering torque by multiplying the difference between the output voltage $V_5$ and the neutral voltage Vr applied through the amplifier 324. Then, the controller 325 communicates a result to the motor rotating portion 326. The motor rotating portion 326 supplies, to the electric motor 20, operating current I corresponding to the direction and the magnitude of the steering torque.

As a result, the electric motor 20 generates the rotational force corresponding to the size and the magnitude of the steering torque generated in the steering system. The rotational force of the motor 20 is transmitted to the output shaft 3 through the worm gear and so forth. Thus, the output shaft 3 is given the assist steering torque so that the load which must be borne by the driver is reduced.

Even in a structure in which the rectangular-wave voltages $V_1$ and $V_2$ are applied to the coils 110 and 111, the output voltage $V_5$ is A/D-converted and a result of the conversion is read at the timing at which the difference in the transient voltage between the output voltages $V_3$ and $V_4$ has appeared. Therefore, the direction and the magnitude of the steering torque which is being generated in the steering system can be detected. Thus, assist steering torque corresponding to the detected values can be generated.

When the structure in which the coils 110 and 111 are operated by the control voltages $V_1$ and $V_2$ each of which varies in the rectangular wave, an electric current is passed through each of the coils 110 and 111 in only a period in which the voltages $V_1$ and $V_2$ are being raised. Therefore, if the duty ratio of the waveforms of the control voltages $V_1$ and $V_2$ is sufficiently reduced, current consumption can significantly be reduced. In the structure according to this embodiment, only the output voltage $V_5$ obtained when a sufficiently large difference is made between the output voltages $V_3$ and $V_4$ in the transition state is required to detect the steering torque. To obtain the output voltage $V_5$, only rise of each of the voltages $V_1$ and $V_2$ is required until the time constant $\tau$ is elapsed from the rising (first transition) of the output voltages $V_1$ and $V_2$. Therefore, the transistors $T_1$ and $T_2$ are required to be turned on for only a period of time somewhat longer than the time constant $\tau$ including a safety ratio. Thus, the duty ratio of the voltages $V_1$ and $V_2$ can significantly be reduced (to, for example, about 5%). As a result, duration of electric current flow through each of the coils 110 and 111 can considerably be shortened. Therefore, the current consumption can be reduced and thus an economic advantage can be realized. Also heat generation can be reduced. If the heat generation is reduced, occurrence of failures can be prevented.

Since supply of the control voltages $V_1$ and $V_2$ which are on-off controlled by the controller 325 to the transistors $T_1$ and $T_2$ enables the coils 110 and 111 to be operated with the rectangular-wave voltage which varies in the rectangular wave, the number of electronic parts can be reduced as compared with the structure in which the sine wave is used to operate the coils. Moreover, each electronic part is not required to be manufactured considerably accurately. Therefore, the cost can be reduced.

This embodiment is structured to appropriately perform the first to third abnormality detecting processes. Therefore, an abnormality of each element of the motor control circuit can be detected. If an abnormality is detected, control of the electric motor 20 is inhibited. Thus, the operation of the electric power steering apparatus is interrupted. Moreover, the abnormality can be recognized by a driver by turning on an alarm lamp provided for the front surface of a driver's seat.

In this embodiment, the transistors $T_1$ and $T_2$ are provided for the corresponding coils 110 and 111. Moreover, the third abnormality detecting process is performed such that only the transistor $T_2$ (or the transistor $T_1$) is operated to perform the abnormality detecting process in accordance with the output voltage $V_3$ (the output voltage $V_4$ when the transistor $T_1$ has been turned on) from the transistor $T_2$. Therefore, an abnormality of short circuit between the coils 110 and 111 can be detected.

When only the transistor $T_2$ is operated to supply an electric current to only the coil 111 in a state in which the coils 110 and 111 are short-circuited with each other, also the electric current is passed through the coil 110 though the transistor $T_1$ is turned off. As a result, the output voltage $V_3$ is made to be lower than the power source $V_{DD}$. In accordance with the output voltage $V_3$, whether or not an abnormality of short circuit between the coils 110 and 111 can be determined.

If the coils 110 and 111 are operated by a common transistor, only either of the coil 110 or the coil 111 cannot be operated. Therefore, the abnormality of short circuit between the coils 110 and 111 cannot be detected.

Therefore, the structure according to this embodiment is able to furthermore improve the reliability of the electric power steering apparatus.

In this embodiment, the transistors $T_1$ and $T_2$ correspond to a switching means.

In this embodiment, the first and second abnormality detecting processes are performed in addition to the third abnormality detecting process. If the motor control circuit has a structure similar to that according to the third embodiment of the above-mentioned United States Patent to detect a variety of abnormalities, the first and second abnormality detecting a processes may be omitted. Note that detection of the short circuit between the coils 110 and 111 cannot be performed by the structure according to the embodiment of the above-mentioned United States Patent. Therefore, the third abnormality detecting process is not omitted.

Although the above-mentioned embodiments has been described about the structure that the torque sensor is applied to the electric power steering apparatus for a vehicle, the present invention is not limited to this.

As described above, the torque sensor according to the present invention has the structure that torque is detected in accordance with transition voltage which is generated between the coils and the electric resistance when voltage which is changed into the rectangular wave is applied to the coils. Therefore, duration of electric current flow through each coil can considerably be shortened, causing current consumption to be reduced. Thus, an economic advantage can be realized. Also heat generation can be reduced. Moreover, the number of required electronic parts can be reduced and significant accuracy is not required for each electronic part. In addition, an effect can be obtained in that the manufacturing cost can be reduced. Since the initial value realized at the time of assembly is stored to correct initial deviation, the reliability can be improved. Since a comparison with the initial value is made in a period of the sample hold in which the steering torque is not being detected so as to detect a failure of each element, a single system circuit can be realized.

Further, as described above, the present invention has the structure that the switching means for causing the pair of coils to generate transient voltages is provided for each of the pair of the coils. Moreover, either of the switching means is operated at timing at which torque detection is not performed. Therefore, abnormalities of the pair of the coils can be detected. As a result, an abnormality of short circuit between the coils can be detected. Consequently, the reliability of the torque sensor can furthermore be improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A torque sensor comprising:

a coil;

a control calculator for varying operation timing of the coil and sample holding timing for detecting torque;

a torque detector for detecting the torque based on sampling of transition voltage of the coil;

a storage device for storing a plurality of initial values, wherein the coil and the torque detector each have an initial value stored in the storage device;

means for comparing each initial value in the storage device with a current value, wherein the current values of at least the coil and the torque detector are compared against their stored initial values respectively when torque detection is not performed, thereby detecting a failure of the torque sensor, wherein the failure of the torque sensor is detected in accordance with an A/D value obtained by A/D conversion without operating the coil after the sample holding.

2. A torque sensor according to claim 1, further comprising a neutral voltage switch which switches a neutral voltage, wherein the failure of the torque sensor is detected in accordance with an A/D value after the neutral voltage has been switched by said neutral voltage switch.

3. A torque sensor for use in an electric power steering apparatus which detects steering torque of a steering wheel and assists a rotation of a steering shaft integrally provided with the steering wheel with a motor, said torque sensor comprising:

a coil;

a torque detector for detecting the steering torque based on sampling of transition voltage of coil;

a control calculator for varying operation timing of the coil and sample holding timing;

a storage device for storing a plurality of initial values, wherein the coil and the torque detector each have an initial value stored in the storage device; and means for comparing the initial value in said storage portion with a current value, wherein the current values of at least the coil and the torque detector are compared against their stored initial values respectively when torque detection is not performed, wherein the failure of the torque sensor is detected in accordance with an A/D value obtained by A/D conversion without operating the coil after the sample holding, thereby detecting a failure of the torque sensor.

4. A torque sensor according to claim 3, further comprising a neutral voltage switch which switches a neutral voltage, wherein the failure of the torque sensor is detected in accordance with an A/D value after the neutral voltage has been switched by said neutral voltage switch.

5. A torque sensor for detecting torque generated in a rotating shaft, comprising:

a pair of coils of which impedances are changed in opposite directions in accordance with the torque;

a pair of electric resistors, each connected in series with one of said pair of coils so as to detect the torque in accordance with transient voltage generated in portions in which said coils and said electric resistors are connected to each other; and switching means for generating the transient voltage, said switching means being provided for each of the pair of said coils, wherein one of said switching means is operated at timing at which the torque is not detected so that a failure of the pair of said coils is detected.

6. A torque sensor according to claim 5, wherein said switching means comprise transistors.

7. A torque sensor for use in an electric power steering apparatus which detects steering torque of a steering wheel and assists a rotation of a steering shaft integrally provided with the steering wheel with a motor, said torque sensor comprising:

a pair of coils of which impedances are changed in opposite directions in accordance with the steering torque;

a pair of electric resistors, each connected in series with one of said pair of coils so as to detect the steering torque in accordance with transient voltage generated in portions in which said coils and said electric resistors are connected to each other; and switching means for generating the transient voltage, said switching means being provided for each of the pair of said coils, wherein one of said switching means is operated at timing at which the steering torque is not detected so that a failure of the pair of said coils is detected.

8. A torque sensor according to claim 7, wherein said switching means comprise transistors.

* * * * *